(12) United States Patent
Suzuki et al.

(10) Patent No.: US 9,438,365 B2
(45) Date of Patent: Sep. 6, 2016

(54) CLIENT SIGNAL MAPPING CIRCUIT AND MAPPING METHOD

(71) Applicant: NIPPON TELEGRAPH AND TELEPHONE CORPORATION, Tokyo (JP)

(72) Inventors: Masahiro Suzuki, Kanagawa (JP); Takuya Ohara, Kanagawa (JP); Takashi Ono, Kanagawa (JP); Shigeki Aisawa, Kanagawa (JP); Masahito Tomizawa, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/837,041

(22) Filed: Aug. 27, 2015

(65) Prior Publication Data

US 2016/0006525 A1  Jan. 7, 2016

Related U.S. Application Data

(62) Division of application No. 13/992,573, filed as application No. PCT/JP2011/078615 on Dec. 9, 2011, now Pat. No. 9,160,479.

(30) Foreign Application Priority Data

Dec. 10, 2010  (JP) ................. 2010-276130
Jun. 20, 2011  (JP) ................. 2011-136733

(51) Int. Cl.
*H04L 12/861* (2013.01)
*H04L 12/801* (2013.01)
(Continued)

(52) U.S. Cl.
CPC ............... *H04J 3/0658* (2013.01); *H04J 3/07* (2013.01); *H04J 3/1652* (2013.01); *H04J 14/0227* (2013.01); *H04Q 11/0005* (2013.01); *H04Q 2011/0045* (2013.01)

(58) Field of Classification Search
CPC ..... H04L 49/90; H04L 47/10; H04L 2012/5652
USPC ................................. 370/412, 474
See application file for complete search history.

(56) References Cited

U.S. PATENT DOCUMENTS

| 5,343,476 A | 8/1994 | Urbansky |
|---|---|---|
| 2005/0100231 A1 | 5/2005 | Wang et al. |

(Continued)

FOREIGN PATENT DOCUMENTS

| JP | 5-48561 A | 2/1993 |
|---|---|---|
| JP | 5-91078 | 4/1993 |

(Continued)

OTHER PUBLICATIONS

International Search Report Issued Mar. 6, 2012 in PCT/JP11/078615, filed Dec. 9, 2011.
"Interfaces for the Optical Transport Network (OTN0)", ITU-T G.709/Y.1331, Total pp. 217, (Dec. 2009).

(Continued)

*Primary Examiner* — Ronald B Abelson
(74) *Attorney, Agent, or Firm* — Oblon, McClelland, Maier & Neustadt, L.L.P

(57) ABSTRACT

A client signal mapping circuit for accommodating a client signal in a transmission frame, including: a buffer unit configured to temporarily store the client signal; a buffer used amount monitoring unit configured to report a used amount of the buffer unit; a stuff processing determination unit configured to compare the used amount of the buffer unit with a predetermined reference value, and a pseudo random sequence signal and the comparison result; an overhead insertion unit configured to add an overhead to the client signal read from the buffer unit to form a transmission frame; and a reading control unit configured to perform control for reading the client signal from the buffer unit based on determination by the stuff processing determination unit.

8 Claims, 27 Drawing Sheets

(51) Int. Cl.
*H04L 12/70* (2013.01)
*H04J 3/06* (2006.01)
*H04J 3/07* (2006.01)
*H04J 3/16* (2006.01)
*H04J 14/02* (2006.01)
*H04Q 11/00* (2006.01)

(56) References Cited

U.S. PATENT DOCUMENTS

2007/0071443 A1 3/2007 Fukumitsu et al.
2010/0098421 A1 4/2010 Itou

FOREIGN PATENT DOCUMENTS

| JP | 2004-282632 | 10/2004 |
|---|---|---|
| JP | 2007-96822 | 4/2007 |
| JP | 2008-92408 | 4/2008 |
| JP | 2009-212882 | 9/2009 |
| WO | WO 2009/001437 | 12/2008 |

OTHER PUBLICATIONS

Suzuki et al., "Waiting Time Jitter Analysis and Suppression Method of Client Signal Transport Over OTNO", IEICE Technical Report, vol. 110, No. 392, OCS2010-116, pp. 99-104, (Jan. 20, 2011) (with English abstract).
Extended European Search Report issued Feb. 18, 2014, in European Patent Application No. 11846946.9.

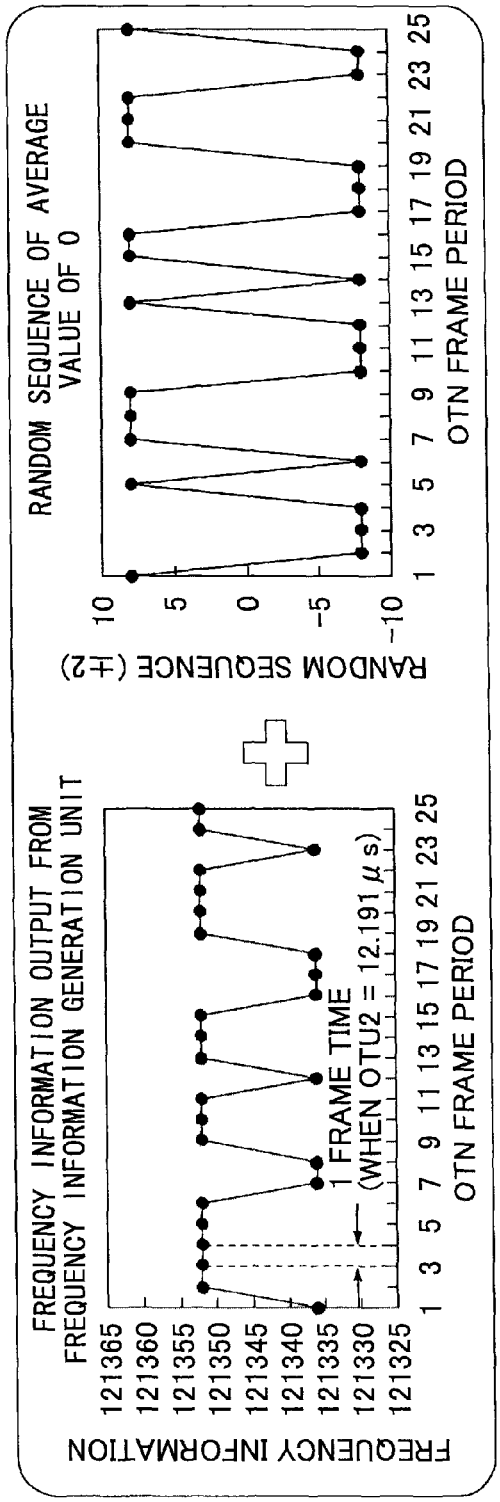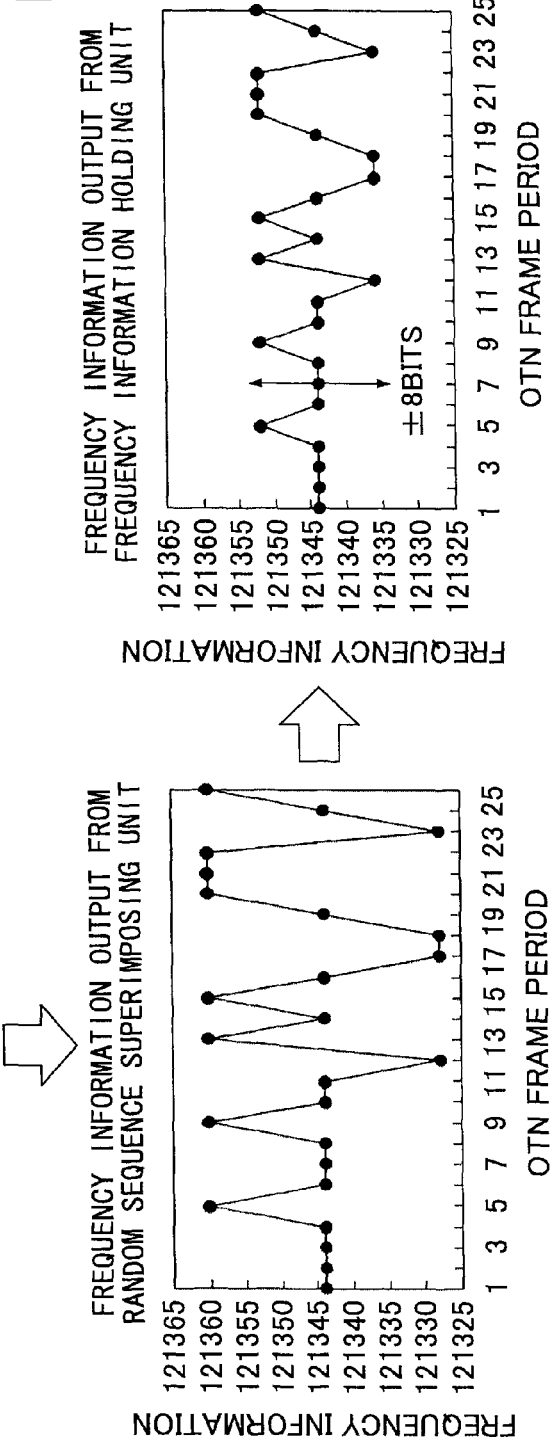
FIG.21

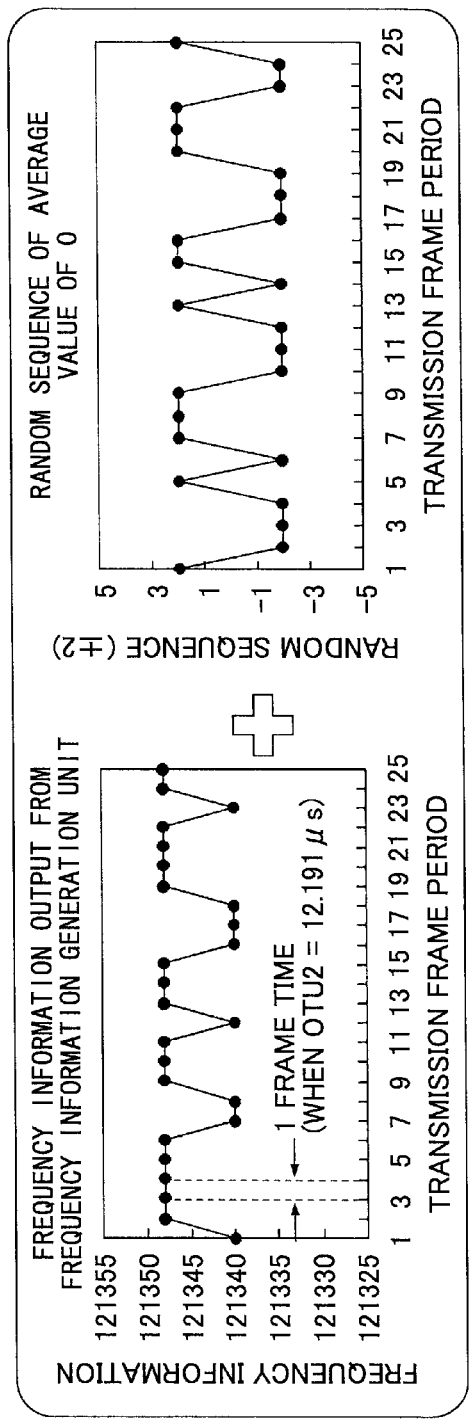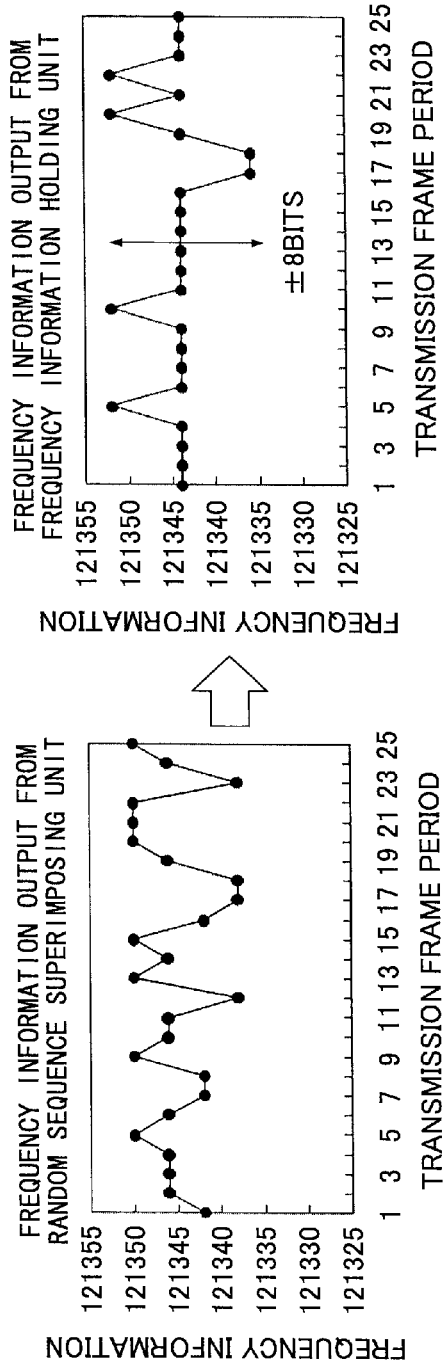
FIG.27

CLIENT SIGNAL MAPPING CIRCUIT AND MAPPING METHOD

CROSS-REFERENCE TO RELATED APPLICATIONS

The present application is a divisional application of and claims the benefit of priority under 35 U.S.C. §120 from U.S. application Ser. No. 13/992,573, filed Jun. 7, 2013, which is based upon and claims the benefit of priority under 35 U.S.C. §119 from Japanese patent application No. 2010-276130 filed on Dec. 10, 2010, and Japanese patent application No. 2011-136733 filed on Jun. 20, 2011, the entire contents of all of which are incorporated herein by reference.

TECHNICAL FIELD

The present invention relates to a client signal mapping circuit and a mapping method. More particularly, the present invention relates to a client signal mapping circuit and a mapping method for performing mapping when accommodating a client signal in OTN (Optical Transport Network) to transmit the client signal.

BACKGROUND ART

As a multiplexing hierarchy of an optical communication network that can transfer a client signal over a long distance with a large capacity, OTN (Optical Transport Network) was recommended as a standardized technique in G.709 by ITU-T in 2001 (refer to non-patent document 1). The OTN has strong management and monitoring functions, and realizes transmission of large capacity by introducing error correction code into the frame format. In the conventional OTN, multiplexing hierarchies for accommodating SDH/SONET (Synchronous Digital Hierarchy/Synchronous Optical Network) and Ethernet are defined. But, types of client signals accommodated by the OTN are diversified with development of ICT (Information and Communication Technology) and with spread and expansion of multimedia services, thus, new multiplexing hierarchies for efficiently accommodating such diversified client signals are additionally defined in G.709 ver. 3 in 2009 (refer to non-patent document 1).

In the conventional OTN, three bit rates of ODU1 (Optical channel Data Unit 1: 239/238×2488320 kbit/s), ODU2 (239/237×9953280 kbit/s), and ODU3 (239/236×39813120 kbit/s) are defined. On the other hand, in OTN in G.709 ver.3, ODU0 (1244160 kbit/s), ODU2e (239/237×10312500 kbit/s), ODU4 (239/227×99532800 kbit/s), and ODUflex are newly added, in which, for ODUflex, the bit rate is 239/238× client signal bit rate in a case where the client signal is a CBR signal and is mapped to ODUflex, and refer to tables 7-8 of the non-patent document 1 for the bit rate in a case where the client signal is encapsulated by GFP-F and mapped to ODUflex. Thus, it becomes possible to provide payload capacities according to bit rates of various client signals.

Also, as mapping schemes, GMP (Generic Mapping Procedure) is newly defined in addition to AMP (Asynchronous Mapping Procedure) and BMP (Bit-synchronous Mapping Procedure). GMP is a mapping method by which a mapping position of a client signal can be determined from the bit rate of the client signal and a payload capacity of an OTN frame that accommodates the client signal.

As mentioned above, thanks to introduction of the newly added ODUs and the GMP scheme, diversified client signals can be accommodated in OTN flexibly and efficiently, so that it is considered that transceivers using OTN will become widespread.

Although various client signals can be accommodated, when accommodating a client signal such as a video signal for which jitter regulation is strict in OTN, there is a fear that destuff jitter may affect transmission quality of the client signal. For accommodating or multiplexing client signals in OTN asynchronously, stuff processing is performed for absorbing frequency deviation. But, since the phase of the reading clock varies when removing a stuff byte at a receiving end, destuff jitter occurs. The destuff jitter occurs according to an inserting cycle of the stuff byte. Thus, if the cycle for inserting the stuff byte is extremely long, destuff jitter of low frequency component occurs, so that it becomes difficult to suppress the destuff jitter by PLL (Phase Locked Loop) and the like.

As a technique for suppressing destuff jitter, there is a method for putting restrictions on clock frequencies such that an area of frequency deviation where a stuff insertion ratio is extremely small is not used (refer to patent document 1).

Also, there is a method for inserting a stuff of 1 bit in a distributed manner for each parallel processing when accommodating a low order frame to a high order frame (refer to patent document 2).

RELATED ART DOCUMENT

[Non-Patent document 1] ITU-T Rec. G.709/Y.1331 "Interfaces for the Optical Transport Network (OTN)" 12/2009.
[Patent document 1] JP 2009-212882
[Patent document 2] JP 2004-282632

SUMMARY OF THE INVENTION

Problem to be Solved by the Invention

However, as to the method for suppressing destuff jitter by putting restrictions on the clock frequency, since it is necessary to provide restriction on the operation frequency range beforehand such that the apparatus does not operate in a frequency near zero stuff jitter, it is not possible to maintain compatibility with apparatuses that operate in ±20 ppm or ±100 ppm that is defined in G.709.

Also, the method for inserting 1 bit stuff in a distributed manner for each parallel processing is not recommended in G.709. In general, in the OTN, stuff is inserted in a particular place of an OH (Overhead) in a unit of 1 byte. Thus, also in this method, there is a problem in that it is not possible to maintain compatibility with existing apparatuses.

The present invention is contrived in view of the above-mentioned problem, and an object of the present invention is to provide a mapping circuit and a mapping method of a client signal by which compatibility with apparatuses complying with the standard recommendation (G.709) can be maintained and destuff jitter can be suppressed with a simple configuration.

Means for Solving the Problem

According to an embodiment of the present invention, a client signal mapping circuit for accommodating a client signal in a transmission frame is provided, the client signal mapping circuit including:

a buffer unit configured to temporarily store the client signal;

a buffer used amount monitoring unit configured to report a used amount of the buffer unit;

a stuff processing determination unit configured to determine necessity of insertion of a stuff byte into a transmission frame and a stuff processing amount based on the used amount of the buffer unit;

an overhead insertion unit configured to add an overhead to the client signal read from the buffer unit to form a transmission frame; and a reading control unit configured to perform control for reading the client signal from the buffer unit based on determination by the stuff processing determination unit, the stuff processing determination unit comprising:

a comparison unit configured to compare the buffer used amount reported from the buffer used amount monitoring unit with a predetermined reference value;

a pseudo random sequence generation unit configured to output a pseudo random sequence signal; and a first adding unit configured to add the pseudo random sequence signal and the comparison result output from the comparison unit.

The stuff processing determination unit may further include:

a stuff information holding unit configured to add stuff information that is input and stuff information that is held until the result becomes a predetermined value.

The stuff processing determination unit may further include:

a plurality of stuff information holding units configured to hold stuff information output from the first adding unit;

a second adding calculation unit configured to add values from the plurality of stuff information holding units, and an averaging unit configured to average the result added in the second adding calculation unit with respect to the number of the stuff information holding units.

According to an embodiment of the present invention, a mapping method for accommodating a client in a transmission frame is provided, the mapping method including:

a buffer used amount monitoring step in which a buffer used amount monitoring unit reports a used amount of a buffer configured to temporarily store the client signal a stuff processing determination step in which a stuff processing determination unit determines necessity of insertion of a stuff byte into a transmission frame and a stuff processing amount based on the used amount of the buffer;

an overhead insertion step in which an overhead insertion unit adds an overhead to the client signal read from the buffer to form a transmission frame; and a reading control step in which a reading control unit performs control for reading the client signal from the buffer based on determination by the stuff processing determination step, the stuff processing determination step comprising:

comparing the buffer used amount reported from the buffer used amount monitoring unit with a predetermined reference value, and adding a pseudo random sequence signal and the comparison result.

The stuff processing determination step may further include:

adding stuff information that is input and stuff information that is held until the result becomes a predetermined value.

The stuff processing determination step may further include:

holding an adding result of the pseudo random sequence signal and the comparison result in a plurality of stuff information holding units;

adding values held in the plurality of stuff information holding units, and averaging the result added in the second adding calculation step with respect to the number of the stuff information holding units.

Further, according to an embodiment of the present invention, a client signal mapping circuit for accommodating a client signal in a transmission frame signal is provided, the client signal mapping circuit including:

an asynchronous buffer unit configured to temporarily store the client signal;

a frequency information generation unit configured to generate frequency information from a clock of the client signal and a clock of a transmission frame signal;

a random signal superimposing unit configured to superimpose a random signal sequence on the frequency information generated by the frequency information generation unit;

a reading control unit configured to control reading of the client signal from the asynchronous buffer unit based on the clock of the client signal and the frequency information; and an overhead insertion unit configured to insert an overhead of a transmission frame signal into a data sequence read from the asynchronous buffer unit.

According to an embodiment of the present invention, a client signal demapping circuit for restoring a client signal from a transmission frame signal is provided, the client signal demapping circuit including:

an overhead extraction unit configured to extract frequency information from the transmission frame signal;

a writing control unit configured to perform writing control for the transmission frame based on the extracted frequency information and the clock of the transmission frame;

a random signal superimposing unit configured to superimpose a random signal sequence on the extracted frequency information;

a clock recovery unit configured to recover a clock of the client signal based on frequency information on which the random signal sequence is superimposed; and an asynchronous buffer unit configured to temporarily store the transmission frame based on a control signal from the writing control unit, and read data based on the clock recovered by the clock recovery unit.

The client signal mapping circuit or the client signal demapping circuit may further include:

a selector unit configured to select one of frequency information on which the random signal sequence is superimposed and frequency information on which the random sequence is not superimposed.

The client signal mapping circuit or the client signal demapping circuit may further include:

a frequency information comparison unit configured to compare frequency information on which the random signal sequence is superimposed with a reference value and to update the frequency information according to the comparison result; or a frequency information holding unit configured to compare frequency information on which the random signal sequence is superimposed with a reference value, update the frequency information according to the comparison result, hold a difference between the frequency information and the comparison result temporarily, and perform adding calculation with next frequency information.

According to an embodiment of the present invention, a client signal mapping method for accommodating a client signal in a transmission frame signal is provided, the client signal mapping method including:

a frequency information generation step in which a frequency information generation unit generates frequency information from a clock of the client signal obtained from an asynchronous buffer unit configured to temporarily store the client signal, and a clock of the transmission frame signal;

a random signal superimposing step in which a random signal superimposing unit superimposes a random signal sequence on the frequency information generated in the frequency information generation step;

a reading control step in which a reading control unit controls reading of the client signal from the asynchronous buffer unit based on the clock of the client signal and the frequency information; and an overhead insertion step in which an overhead insertion unit inserts an overhead of a transmission frame signal into a data sequence read from the asynchronous buffer unit.

According to an embodiment of the present invention, a client signal demapping method for restoring a client signal from a transmission frame signal is provided, the client signal demapping method including:

an overhead extraction step in which an overhead extraction unit extracts frequency information from the transmission frame signal;

a writing control step in which a writing control unit performs writing control for the transmission frame based on the extracted frequency information and the clock of the transmission frame;

a random signal superimposing step in which a random signal superimposing unit superimposes a random signal sequence on the extracted frequency information;

a clock recovery step in which a clock recovery unit recovers a clock of the client signal based on frequency information on which the random signal sequence is superimposed; and an asynchronous buffering step of temporarily storing the transmission frame based on a control signal in the writing control step, and reading data based on the clock recovered by the clock recovery step.

The client signal mapping method or the client signal demapping method may further include:

a step of selecting one of frequency information on which the random signal sequence is superimposed and frequency information on which the random sequence is not superimposed; or a frequency information comparison step of comparing frequency information on which the random signal sequence is superimposed with a reference value and updating the frequency information according to the comparison result.

The client signal mapping method or the client signal demapping method may further include:

a frequency information holding step of comparing frequency information on which the random signal sequence is superimposed with a reference value, updating the frequency information according to the comparison result, holding a difference between the frequency information and the comparison result temporarily, and performing adding calculation with next frequency information.

Effect of the Present Invention

As mentioned above, according to the present invention, a stuff processing amount is determined based on a client signal storing amount in the buffer, and the stuff processing amount is randomly modulated by a pseudo random sequence signal. Thus, it is possible to suppress occurrence of low frequency jitter. Also, the present invention can be easily carried out by providing the pseudo random sequence generation unit to an existing apparatus. In addition, in the receiving side, the client signal can be restored by performing normal stuff processing, which produces effects for maintaining compatibility with apparatuses complying with G.709.

Also, according to the present invention, frequency information is determined based on clock counts of the client signal and the transmission frame signal or based on the client signal storing amount in the buffer, and, the frequency information is randomly modulated by the random signal sequence. Thus, it is possible to suppress occurrence of low frequency jitter. Also, the present invention can be easily carried out by providing the pseudo random sequence superimposing unit to an existing apparatus. In addition, in the receiving side, the client signal can be restored by performing normal stuff processing. Thus, effects can be obtained for maintaining compatibility with apparatuses complying with G.709.

BRIEF DESCRIPTION OF THE DRAWINGS

FIG. 21 shows frequency information (image) generated by a frequency comparison unit in the seventh embodiment of the present invention;

FIG. 27 shows frequency information generated by the frequency information holding unit in the eighth embodiment of the present invention.

EMBODIMENTS FOR CARRYING OUT THE INVENTION

In the following, embodiments of the present invention are described with reference to figures.

[First Embodiment]

Figure 1:
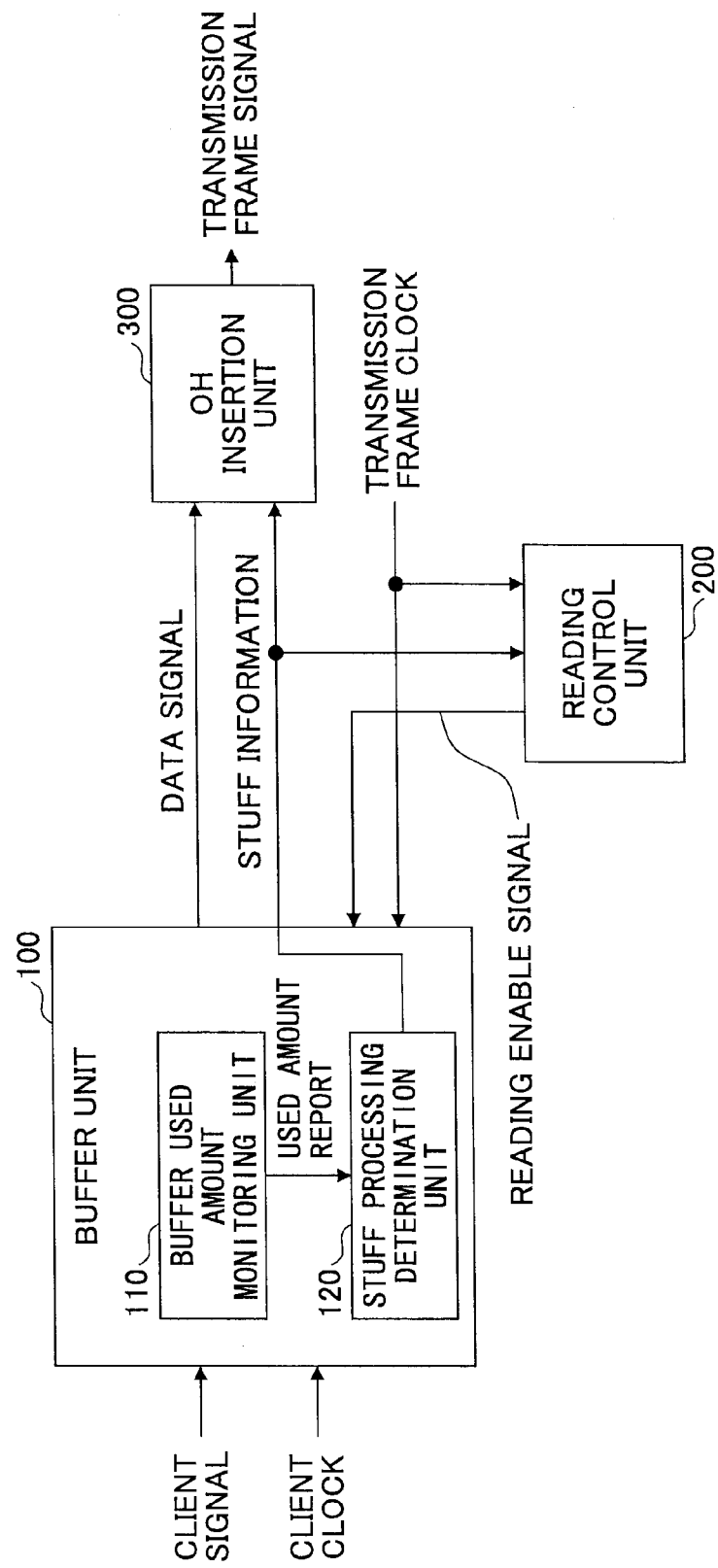
FIG. 1 is a block diagram of a client signal mapping circuit in a first embodiment of the present invention.

FIG. 1 shows a configuration of a client signal mapping circuit in the first embodiment of the present invention. In the present embodiment, a client signal mapping circuit using pseudo random sequence modulation is described.

The client signal mapping circuit shown in the figure includes a buffer unit 100 configured to write a client signal, a reading control unit 200, and an overhead (OH) insertion unit 300.

Figure 2:
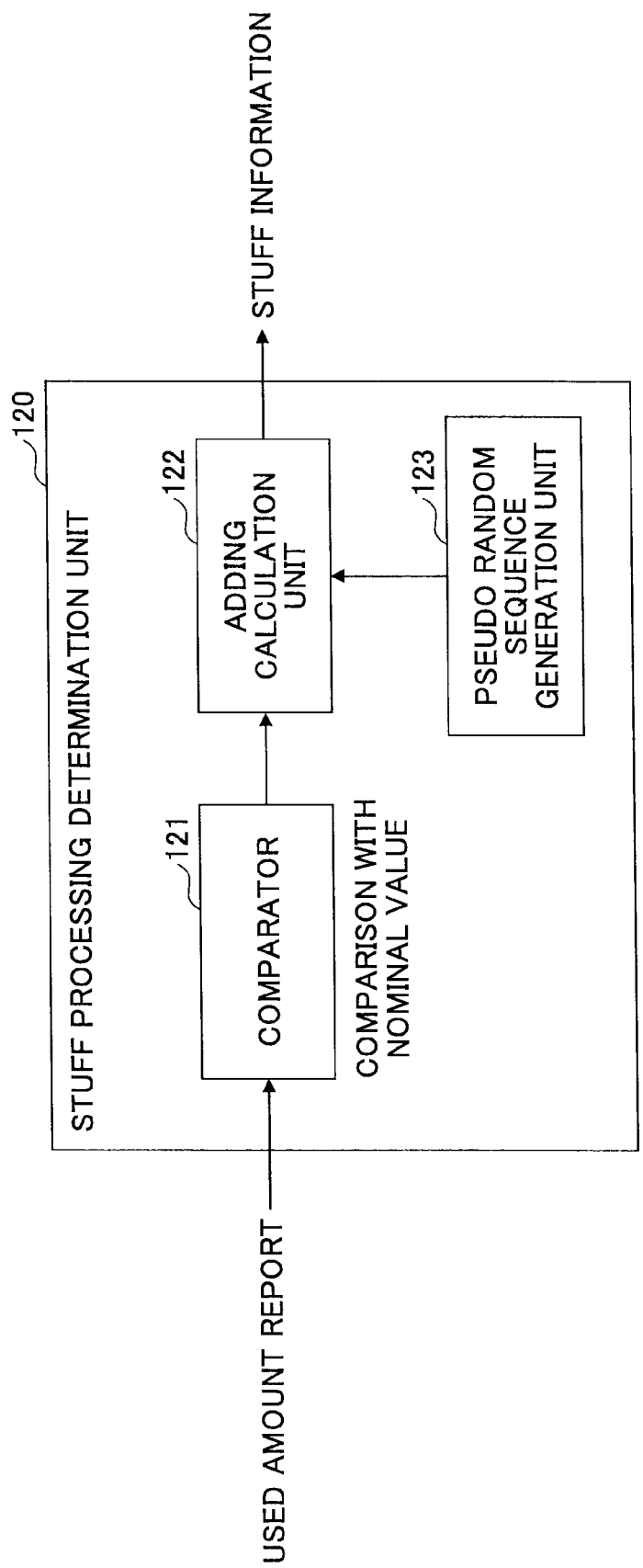
FIG. 2 is a block diagram of a stuff processing determination unit in the first embodiment of the present invention.

The buffer unit 100 includes a buffer used amount monitoring unit 110 configured to monitor a buffer used amount, and a stuff processing determination unit 120 configured to determine necessity of stuff processing based on the report of the used amount from the buffer used amount monitoring unit 110. As shown in FIG. 2, the stuff processing determination unit 120 includes a comparator 121, an adding calculation unit 122, and a pseudo random sequence generation unit 123.

Operation of the above-mentioned configuration is described.

The buffer unit 100 sequentially writes received client signals. A client clock extracted from the input client signal is used as a clock used for writing. DRAM (Dynamic Random Access Memory), SRAM (Static Random Access Memory) and the like can be used as the buffer, and it is desirable that wiring and reading can be performed asynchronously in the buffer. Also, it is normally possible to use a memory of an asynchronous FIFO type.

The buffer used amount monitoring unit 110 of the buffer unit 100 always monitors a written data amount, and reports a used amount of the buffer to the stuff processing determination unit 120 as necessary. The buffer used amount may be reported for each transmission 1 frame time or when the buffer used amount is updated, but the reporting method of buffer used amount is not limited to these.

The stuff processing determination unit 120 determines necessity of stuff processing according to a buffer used amount input from the buffer used amount monitoring unit 110. The "stuff processing" is processing for determining necessity of insertion of a stuff byte (a dummy byte having no data) into a transmission frame, and for determining a stuff processing amount at the same time (detailed operation of the stuff processing determination unit 120 is described later).

The OH (overhead) insertion unit 300 adds an overhead to data read from the buffer unit 100 based on stuff information output from the stuff processing determination unit 120, and inserts a stuff byte.

The reading control unit 200 outputs a reading enable signal to the buffer unit 100 based on stuff information output from the stuff information determination processing unit 120. Data is output from the buffer unit 100 to the OH insertion unit 300 only in a period during which the reading enable signal is input to the buffer unit 100. Control is performed such that the reading enable signal is not output in a period during which the OH is inserted or a period during which a stuff byte is inserted. Also, reading is performed using a transmission frame clock in the apparatus as a reading clock of the buffer unit 100.

The stuff processing determination unit 120 compares the received buffer used amount and data held in the comparator 21. The comparator 121 holds a threshold for performing stuff processing, and the stuff processing determination unit 120 compares the reported buffer used amount with the stuff processing threshold in the comparator 121, and instructs stuff processing when the buffer used amount exceeds the stuff processing threshold. For example, under a condition that 1 byte stuff is always inserted when frequency deviation of the client signal is 0 ppm, if the frequency deviation of the client signal becomes +x ppm, the data amount of the client signal stored in the buffer unit 100 increases every second as time passes. Assuming that the buffer used amount is M bytes when the frequency deviation of the client signal is 0 ppm, a signal for instructing stuff processing is output at the time when the buffer used amount becomes M+1 bytes. On the other hand, when the frequency deviation of the client signal is −x ppm, a signal for instructing stuff processing is sent from the comparator at the time when the used amount of the buffer unit 100 becomes M−1 bytes.

The stuff processing determination unit 120 absorbs the frequency deviation of the client signal by inserting a stuff byte to a position where data byte is always inserted normally (to be referred to as negative stuff processing hereinafter) or by inserting data in a position where a stuff byte is always inserted normally (to be referred to as positive stuff processing hereinafter), based on a value output from the comparator 121.

The instruction signal of stuff processing output from the comparator 121 is output to the adding calculation unit 122, so that the adding calculation unit 122 performs adding calculation for adding the instruction signal and a pseudo random sequence signal output from the pseudo random sequence generation unit 123. Normally, a binary signal of 0 or 1 is used as the pseudo random sequence signal. But, in the present embodiment, a binary signal of −1 or 1 is used as the pseudo random sequence signal. Any random signal such as the Gold sequence, M sequence and the like can be used as the pseudo random sequence signal. When the stuff information is −1 after the calculation, negative stuff processing of 1 byte is performed. When the stuff information is 0, stuff processing is not performed. When the stuff information is +1, positive stuff processing is performed. The comparator 121 outputs stuff information of −1, 0 or +1 according to the buffer used amount. The adding calculation unit 122 adds, to the value, a value of −1 or +1 output from the pseudo random sequence generation unit 123, and stuff information of −2~+2 is output finally. When the stuff information is −2, negative stuff processing of 2 bytes is performed, and when the stuff information is +2, positive stuff processing of 2 bytes is performed.

As mentioned above, by performing modulation using the pseudo random sequence on the stuff processing, stuff processing frequency increases, so that it becomes possible to suppress jitter of low frequency component that cannot be fully suppressed by PLL and the like.

[Second Embodiment]

Figure 3:
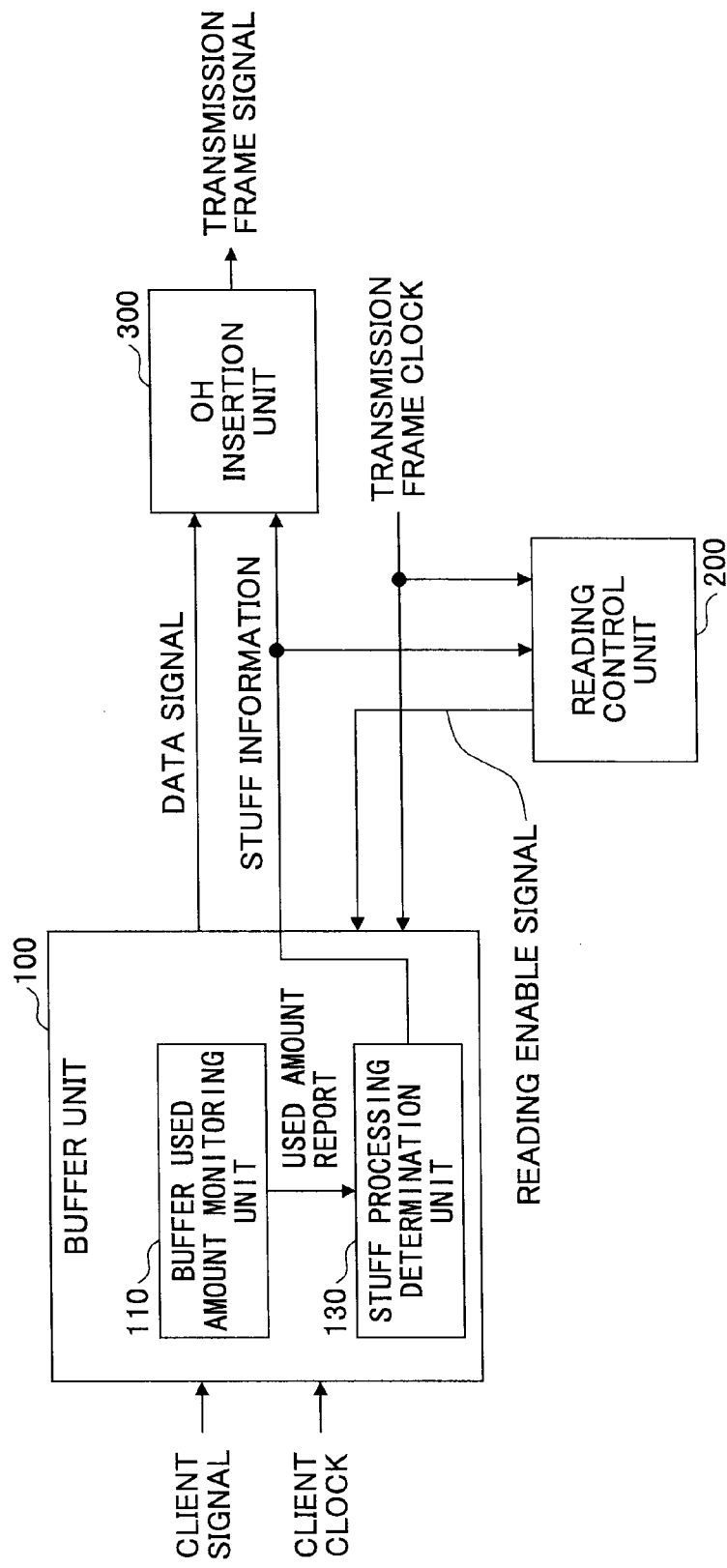
FIG. 3 is a block diagram of a client signal mapping circuit in a second embodiment of the present invention.

FIG. 3 shows a configuration of a client signal mapping circuit in the second embodiment of the present invention. Although the client signal mapping circuit shown in the figure is similar to the configuration of FIG. 1 in the first embodiment, the function of the stuff processing determination unit of the buffer unit 100 is different.

Figure 4:
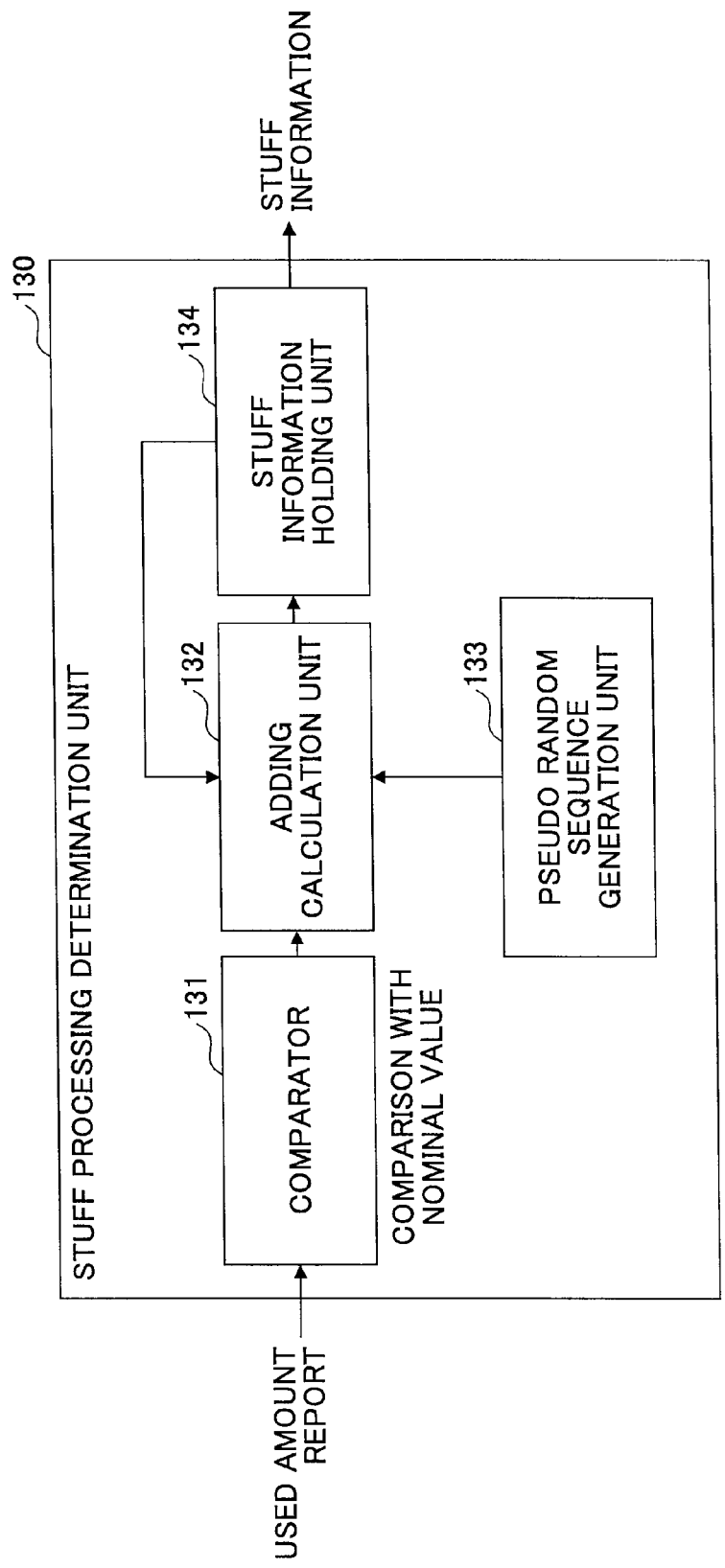
FIG. 4 is a block diagram of a stuff processing determination unit in the second embodiment of the present invention.

FIG. 4 shows a configuration of the stuff processing determination unit in the second embodiment of the present invention.

The stuff processing determination unit 130 shown in the figure includes a comparator 131, an adding calculation unit 132, a pseudo random sequence generation unit 133 and a stuff information holding unit 134.

Difference from the first embodiment is that the stuff processing determination unit 130 includes the stuff information holding unit 134.

The stuff information holding unit 134 holds a plurality of pieces of stuff information output from the adding calculation unit 132, and outputs, as stuff information, a result of addition of past stuff information. For example, in a case where values output from the adding calculation unit 132 are +1, +1, 0, 0, +1, +1 and +1 . . . , the stuff information holding unit 134 holds a result of sum of currently stored stuff information and input stuff information like+1, +2, +2, +2, +3, +4 . . . . At the time when the value reaches a predetermined value, the stuff information holding unit 134 outputs stuff information, and after that, the value in the stuff information holding unit 134 is reset, and similar processing is repeated again.

By providing the stuff information holding unit 134, stuff processing of three values, like+1, 0, −1, for example, becomes possible. The comparator 131 holds values such as −0.5, +0.5 (4 bits unit) as references, and the comparator 131 outputs values such as −0.5, 0 and +0.5 according to the buffer used amount.

The pseudo random sequence generation unit 133 outputs 0, 1 signal by using values such as −0.5, +0.5, and the adding calculation unit 132 performs addition calculation. The adding result is output to the stuff information holding unit 134, and the stuff information holding unit 134 outputs stuff information at the time when the value becomes −1 or +1. If the stuff information holding unit 134 is not provided, stuff information of 5 values such as −2, −1, 0, +1 and +2 is output. On the other hand, by providing the stuff information holding unit 134, it becomes possible to output stuff information of three values such as −1, 0 and +1, so that it becomes possible to maintain compatibility with apparatuses such as an existing OTN transceiver that performs stuff processing by using three values.

[Third Embodiment]

Figure 5:
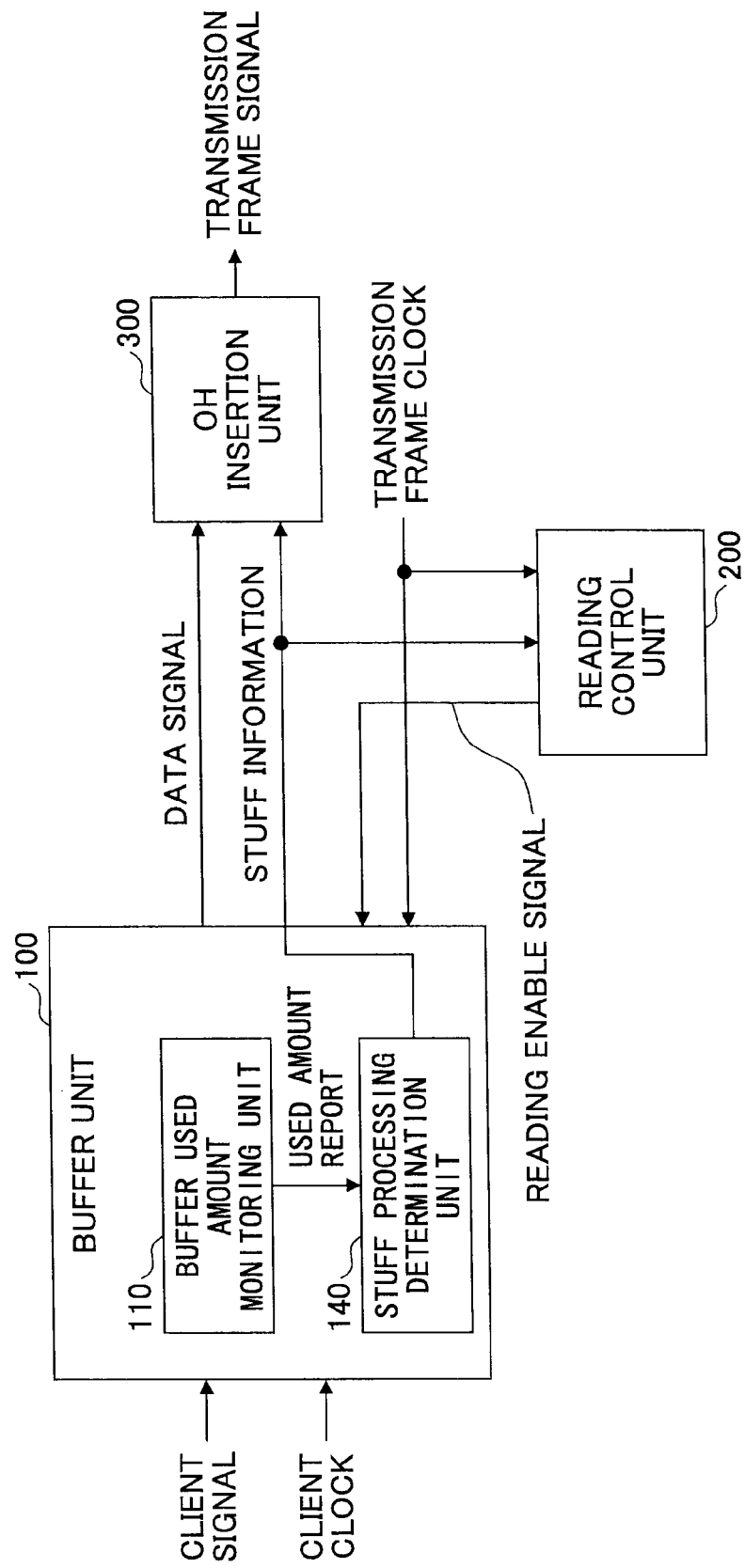
FIG. 5 is a block diagram of a client signal mapping circuit in a third embodiment of the present invention.

FIG. 5 shows a configuration of a client signal mapping circuit in the third embodiment of the present invention. Although the client signal mapping circuit shown in the figure is similar to the configuration of FIG. 3 in the third embodiment, the function of the stuff processing determination unit of the buffer unit 100 is different. In the present embodiment, a client signal mapping circuit to which average processing is added is described.

Figure 6:
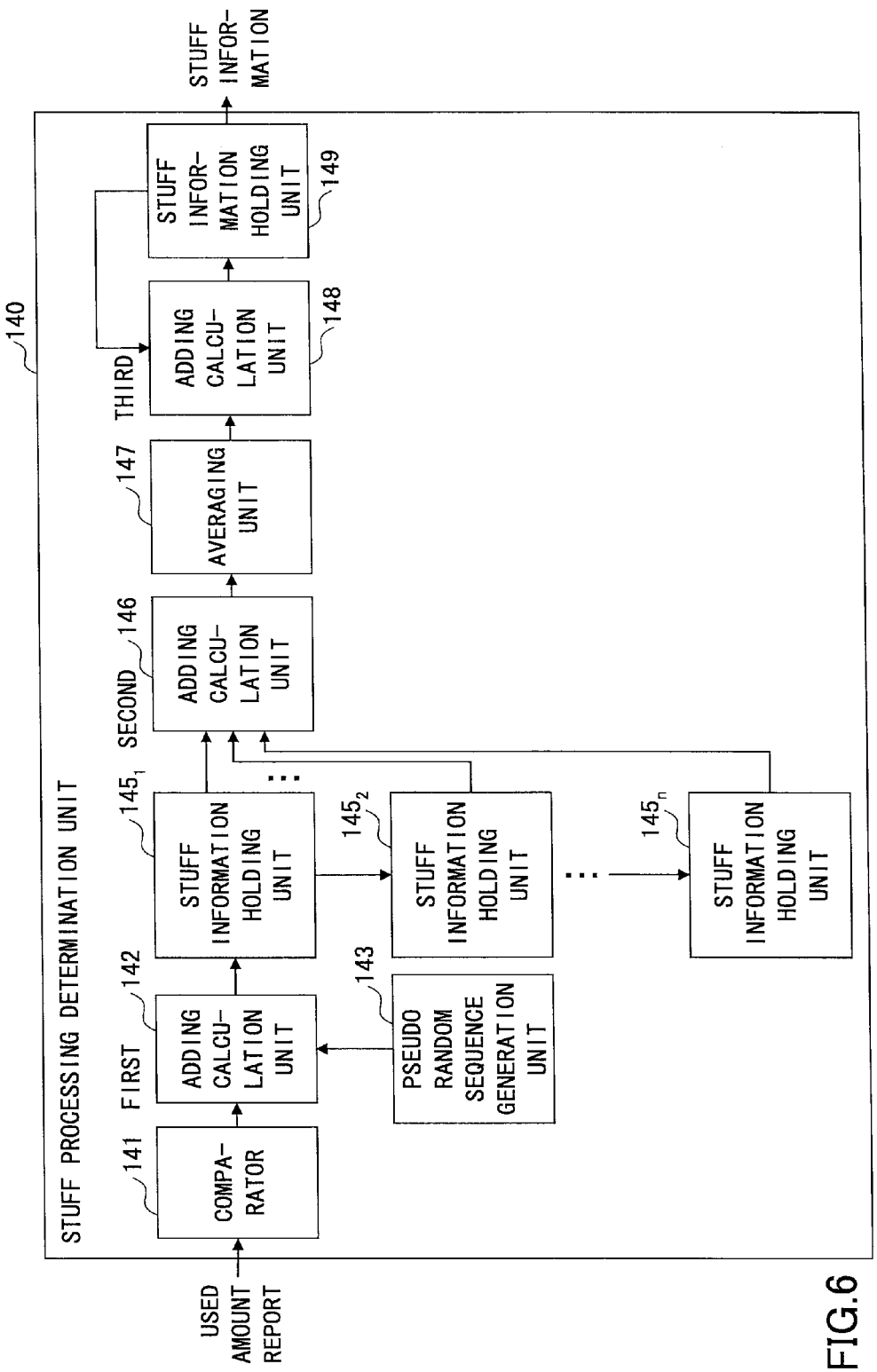
FIG. 6 is a block diagram of a stuff processing determination unit in the third embodiment of the present invention.

FIG. 6 shows a configuration of the stuff processing determination unit in the third embodiment of the present invention.

The stuff processing determination unit 140 shown in the figure includes a comparator 141, a first adding calculation unit 142, a pseudo random sequence generation unit 143 and stuff information holding units $145_1$~$145_n$, a second adding calculation unit 146, an averaging unit 147, a third adding calculation unit 148, and a stuff information holding unit 149.

Difference from the second embodiment is that the stuff processing determination unit 140 includes a plurality of stuff information holding units $145_1$~$145_n$, the second adding unit 146 and the averaging unit 147. By averaging a plurality of calculation results, the stuff processing amounts are smoothed, so that it becomes possible to enhance the effect for suppressing destuff jitter as a result. The stuff information output from the first adding calculation unit 142 is stored in the stuff information holding unit $145_1$.

An output from the first adding calculation unit 142 triggers the stuff information held in the stuff information holding unit $145_1$ to be output to the stuff information holding unit $145_2$, so that values of the stuff information holding unit $145_n$ are successively updated. When updating the stuff information, each of the stuff information holding units $145_1$~$145_n$ outputs stuff information to the second adding calculation unit 146, so that the second adding calculation unit 146 performs adding processing. After the adding processing, averaging processing is performed by the averaging unit 146 according to the number of the stuff information holding units 145, and the result is output to the third adding calculation unit 148.

In the same way as the second embodiment, the third adding calculation unit 148 and the stuff information holding unit 149 perform addition and holding of stuff information until the value becomes a predetermined value. When the value reaches a defined value, the stuff information is output, and the value in the stuff information holding unit 149 is reset. Although the stuff information holding units $145_1$~$145_n$ can be configured using a shift register, the configuration is not limited to this. Also, although pseudo random sequence is output from the pseudo random generation unit 143 to the first adding calculation unit 142 in the configuration of FIG. 6, it is possible to delete the first adding calculation unit 142 so as to output pseudo random sequence to the third adding calculation unit 148.

[Fourth Embodiment]

Figure 7:
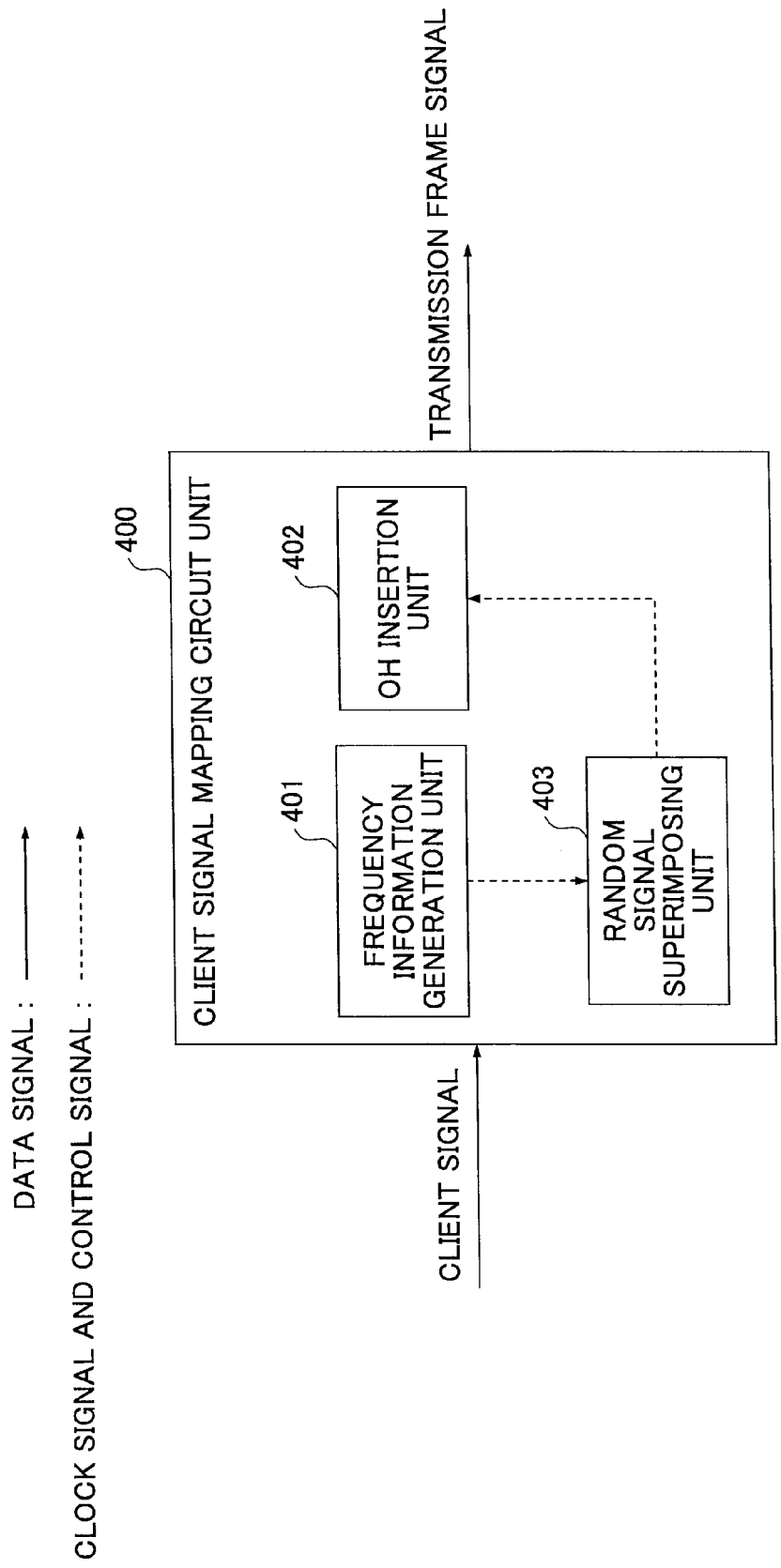
FIG. 7 is a block diagram (1) of a client signal mapping circuit in a fourth embodiment of the present invention.

FIG. 7 shows a configuration of a typical client signal mapping circuit in the fourth embodiment of the present invention.

The client signal mapping circuit unit 400 shown in the figure fulfill a role of accommodating client signals in a transmission frame signal, and it includes in its inside a frequency information generation unit 401 configured to generate frequency information based on a client clock, an overhead (to be referred to as OH hereinafter) insertion unit 402 configured to insert an overhead of a transmission frame, and a random signal superimposing unit 403 configured to superimpose a random signal sequence on the frequency information.

Figure 8:
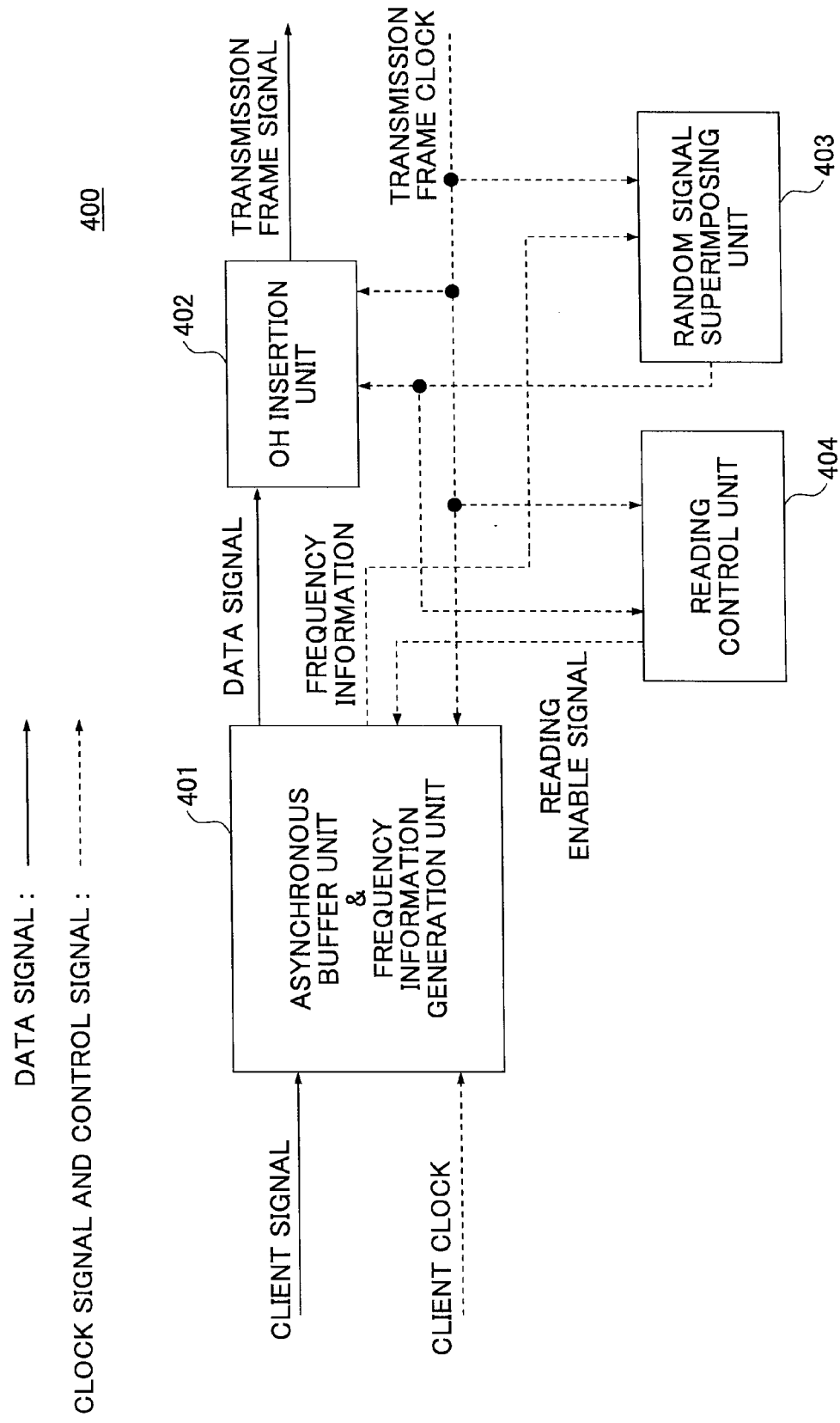
FIG. 8 is a block diagram (2) of a client signal mapping circuit in the fourth embodiment of the present invention.

FIG. 8 shows the configuration of the client signal mapping circuit unit in the fourth embodiment of the present invention in mode detail.

In the following, a function of each block is described with reference to FIG. 8. FIG. 8 is a diagram showing a more detailed configuration of the client signal mapping circuit unit 400 shown in FIG. 7. The client signal mapping circuit unit 400 is provided with an asynchronous buffer unit frequency information generation unit 401, a reading control unit 404, a random signal superimposing unit 403, and an OH insertion unit 402.

A client signal supplied to the client signal mapping circuit unit 400 is temporarily stored in the asynchronous buffer unit 401. The client signal is written in the asynchronous buffer unit 401 based on the clock of the client signal, and the written client signal is read based on the transmission frame clock, thus, conversion of clocks is performed. The asynchronous buffer can be configured by using a memory such as a DRAM (Dynamic Random Access Memory) or an SRAM (Static Random Access Memory). But, the asynchronous buffer is not limited to these as long as the memory can perform reading and writing asynchronously. Also, the asynchronous buffer unit 401 is provided with a frequency information generation unit configured to detect a frequency deviation between the client clock and the transmission frame clock. The frequency information can be generated by counting the amount of client signals stored in the asynchronous buffer unit 401 or the number of client clocks. In a case where network synchronization is not performed, the storing amount of the client signal and the number of clocks are counted in units of the transmission frames or with reference to a particular transmission frame clock number. In a case where network synchronization is performed, it is possible to count the storing amount of the client signal or the clock of the client signal with reference to the clock for network synchronization and to generate the frequency information.

Figure 9:
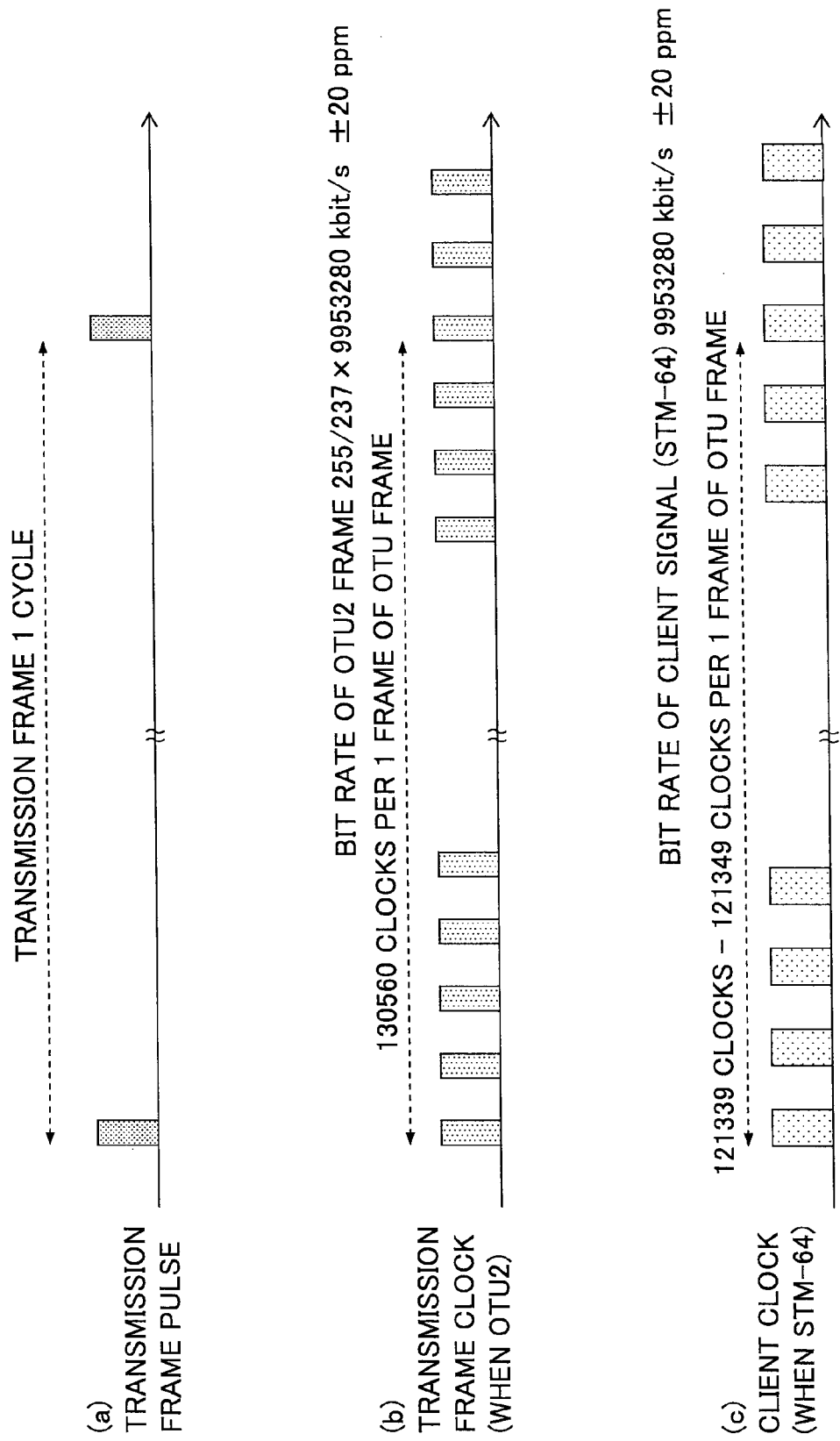
FIG. 9 shows a frequency information detection method in the fourth embodiment of the present invention.

A method for generating the frequency information is described in the following by using concrete examples. It is assumed that the client signal is CBR10G (Constant Bit rate 10 Giga, the bit rate is 9953280 kbit/s), and that the client signal is accommodated in a transmission frame of OTU2 (Optical channel Transport Unit, the bit rate is 255/237× 9953280 kbit/s). Basically, the frequency information is updated in each cycle of the transmission frame, the number of clocks of the client clock is counted with reference to a transmission frame pulse indicating one cycle of the transmission frame or the number of clock of the transmission frame clock (in the case of OTN, one frame corresponds to 4080 column×4 row×8 bit=130650 clocks). According to G. 709, since the frequency range of the transmission frame clock and the client clock is ±20 ppm for each of them, the maximum value of the client clocks counted in one frame time is 121349 clocks based on the following equation, $$\frac{4080 \times 8 \times 4 \times \left((\text{BIT RATE OF } CBR10G) \times \left(1 + \frac{20}{1000000}\right)\right)}{\left((\text{BIT RATE OF } OTU2) \times \left(1 - \frac{20}{1000000}\right)\right)} = 121348.8$$

and the minimum value of the counted client clocks is 121339 clocks according to the following equation (refer to FIG. 9).

$$\frac{4080 \times 8 \times 4 \times \left((\text{BIT RATE OF } CBR10G) \times \left(1 - \frac{20}{1000000}\right)\right)}{\left((\text{BIT RATE OF } OTU2) \times \left(1 + \frac{20}{1000000}\right)\right)} = 121399.1$$

Figure 10:
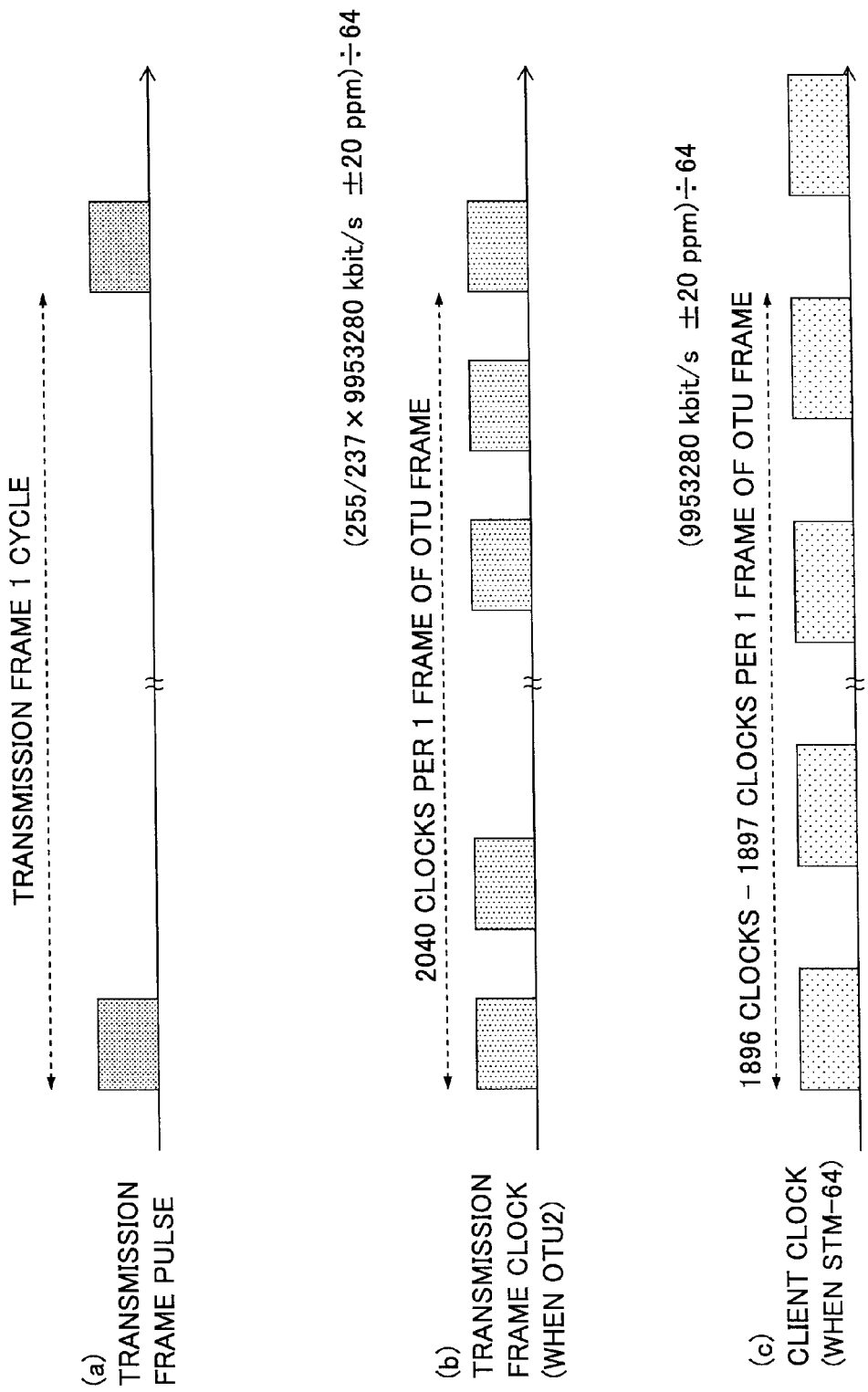
FIG. 10 shows a frequency information detection method (in a case of 64 parallels) in the fourth embodiment of the present invention.

The number of counted client clocks is the number of bits of the client signal accommodated in the transmission frame, and the number of counted client clocks can be handled as a frequency deviation between both of the clocks. The frequency information may be the number of counts of the client clock or may be a difference between the number of counted clocks and a reference value of 121344 (when frequency deviation between the client clock and the transmission frame clock is 0). The form of the frequency information can be arbitrarily determined and it is not limited to these. Also, since an integrated circuit such as an LSI operates with a frequency of about several hundreds of MHz, it is normal that processing is performed in parallel. For example, when generating frequency information from 64 parallel client signals, as shown in FIG. 10, it is possible to use client clock numbers 1895~1897 counted in one transmission frame cycle of 2040 clocks as frequency information, and also it is possible to use a difference between the detected client clock number and a reference value 1896 (when frequency deviation between the client clock and the transmission frame clock is 0). Accordingly, the form of frequency information can be selected arbitrarily. Also, as methods for detecting frequency information, there are a method of counting the clock number, a method of detecting frequency information from the number of pieces of data stored in the buffer unit, a method of detecting frequency information by using an external frequency counter or the like. The method for detecting the frequency information is not limited to these.

Figure 18:
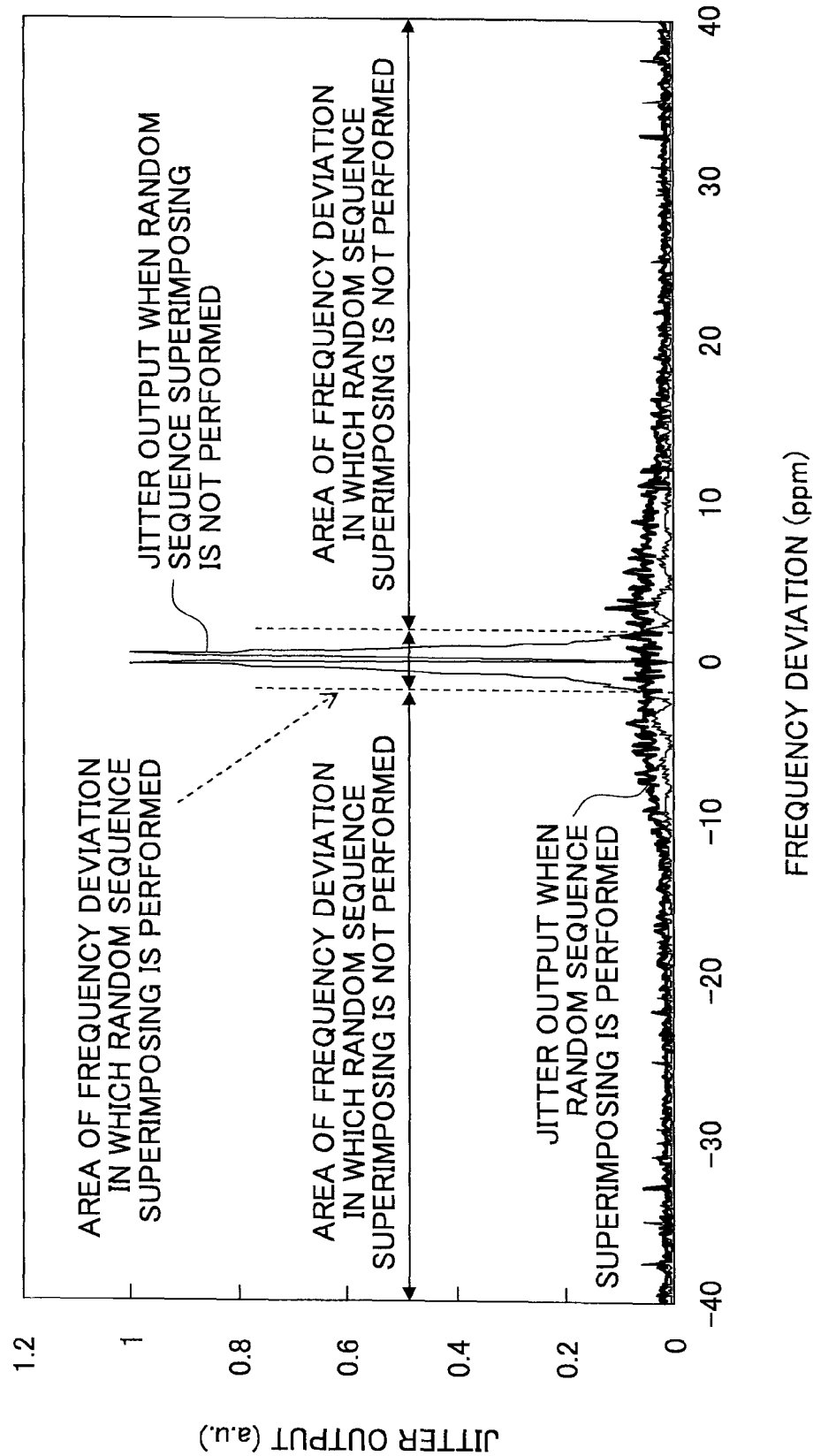
FIG. 18 shows jitter outputs when ODU2 accommodates STM-64 in the sixth embodiment of the present invention.

The frequency information generated in the frequency generation unit 401 is output to the random signal superimposing unit 403. The random signal superimposing unit 403 superimposes a random sequence in which the average value is 0 on the frequency information. As the random sequence, a pseudo random sequence such as M sequence or Gold sequence can be selected. It is possible to configure these sequences by using a shift register, and the sequence can be easily implemented to an LSI. The random sequence is not limited to these. Other than the pseudo random signal, uniform random number or normal random number or the like can be used as the random sequence. As to superimposing of the random sequence, for example, in a case where the bandwidth of PLL is 10 Hz as shown in FIG. 18 that is described later, pseudo random binary bit sequence $2^7-1$ can be used as the random sequence.

In the following, concrete processing of the random signal superimposing unit 403 is described.

Figure 11:
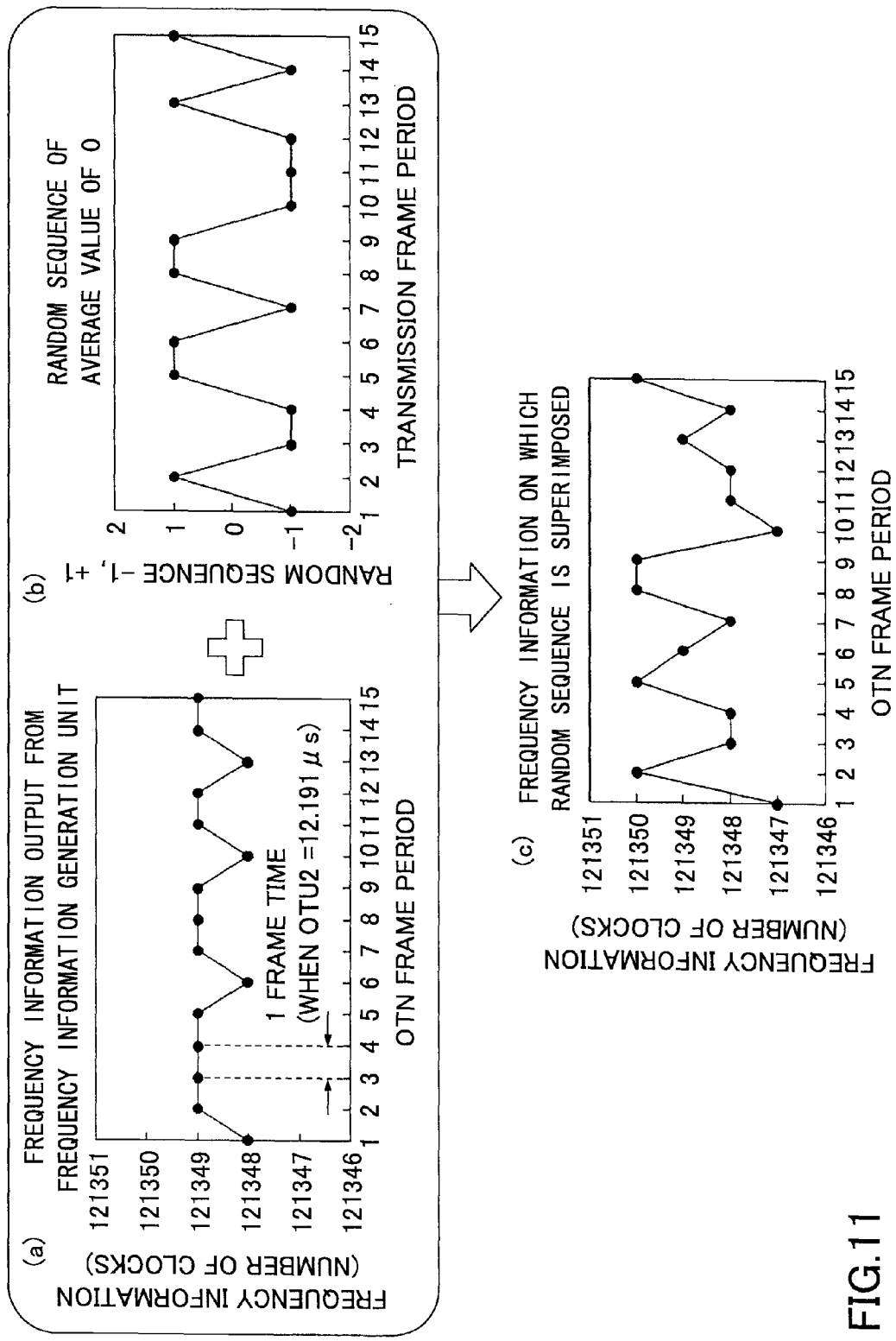
FIG. 11 shows frequency information on which a random sequence is superimposed in the fourth embodiment of the present invention.

Assuming that the before-described client signal (CBR10G) and the transmission frame signal (OTU2) are used and that the number of clocks of the client clock counted in units of 1 frame is used as the frequency information, the frequency information may take values of 121339~121349 as shown in FIG. 11(a) (this value may vary accordion to frequency deviation range of the client clock and the transmission frame clock, the bit rate of the client signal, and the bit rate of the transmission frame). The random sequence (FIG. 11(b)) in which the average value is 0 is superimposed on the generated frequency information by the random signal superimposing unit. In the example shown in FIG. 11, although a random sequence of ±1 is superimposed, this value may be determined arbitrarily. The value may be an integer value such as ±2, ±3, ±4, a decimal value such as ±0.1, ±0.2, ±0.3, ±0.4, a random number uniformly distributed or normally distributed in ±x, or the like. The random sequence is not limited to these, and a random sequence that is obtained by combining them may be superimposed. Frequency information (FIG. 11(c)) on which the random sequence of ±1 is finally superimposed takes values within a range of 121338~121350, and the frequency information is output to the OH insertion unit 402 and to the reading control unit 404 respectively.

The reading control unit 404 controls a period during which the client signal is read based on the clock of the transmission frame and the frequency information, so as to output a reading enable signal to the asynchronous buffer unit 401 in a period other than an OH insertion period and a stuff byte insertion period.

The asynchronous buffer unit 401 outputs the client signal from the asynchronous buffer unit 401 only in a period during which the reading enable signal is supplied. The OH insertion unit 402 inserts OH of the transmission frame into the client signal output from the asynchronous buffer unit 401. At that time, the frequency information is inserted in the OH, and finally, the transmission frame signal is output. On the other hand, in the receiving side, the client signal is restored from the transmission frame signal by using a demapping circuit.

Figure 12:
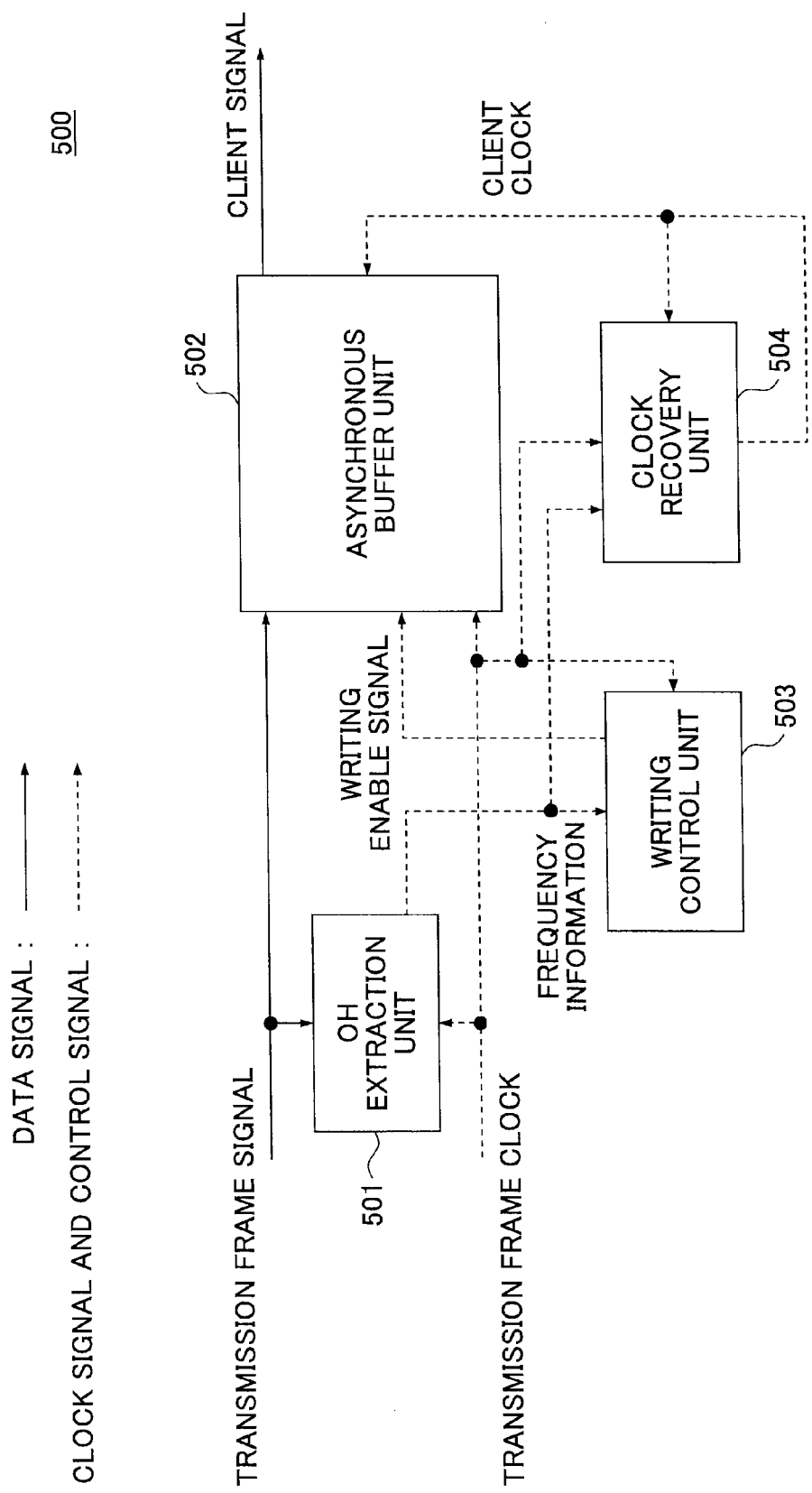
FIG. 12 is a block diagram of a client signal demapping circuit in the fourth embodiment of the present invention.

A configuration example of a client signal demapping circuit unit in the receiving side is shown in FIG. 12.

The client signal demapping circuit unit 500 is provided with an OH extraction unit 501, an asynchronous buffer unit 502, a writing control unit 503 and a clock recovery unit 504. In the following, a function of each block is described in an order according to the flow of the signal. The OH extraction unit 501 extracts an OH from the received transmission frame. The OH is used for monitoring signal quality and monitoring alarms and the like. The OH extraction unit also reads the frequency information. The frequency information that is read is output to the writing control unit 503 and the clock recovery unit 504. The writing control unit 503 outputs a writing enable signal to the asynchronous buffer unit 502 only in a period corresponding to data of the client signal based on the frequency information. On the other hand, the clock recovery unit 504 recovers the client clock based on the received transmission frame clock and the frequency information. As the clock recovery unit 504, a synchronization circuit such as a PLL (Phase Locked Loop) can be used in general, but the configuration of the clock recovery unit 504 is not limited to this, and the configuration is not specifically limited in the present embodiment. The recovered client clock is output to the asynchronous buffer unit 502, and is used as a reading clock. Client data stored in the received transmission frame signal is written in the asynchronous buffer unit 502 with a transmission frame clock, and reading is performed based on the client clock restored in the clock recovery unit 504 so that the client data is restored.

The above-described client signal demapping circuit unit 500 is a configuration of a general demapping circuit, and the present invention is not limited to a configuration of the demapping circuit.

[Fifth Embodiment]

Figure 13:
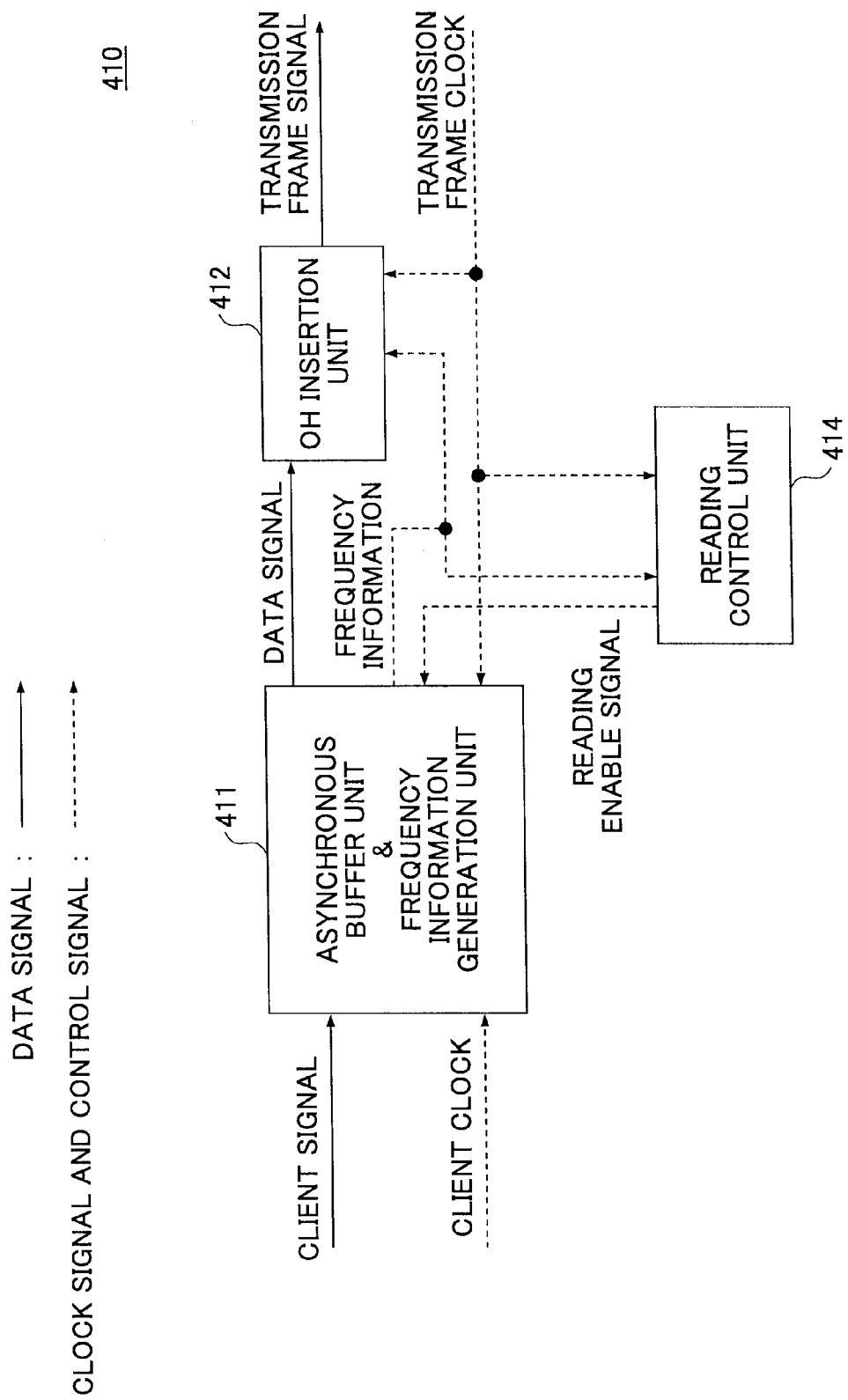
FIG. 13 is a block diagram of a client signal mapping circuit in a fifth embodiment of the present invention.
Figure 14:
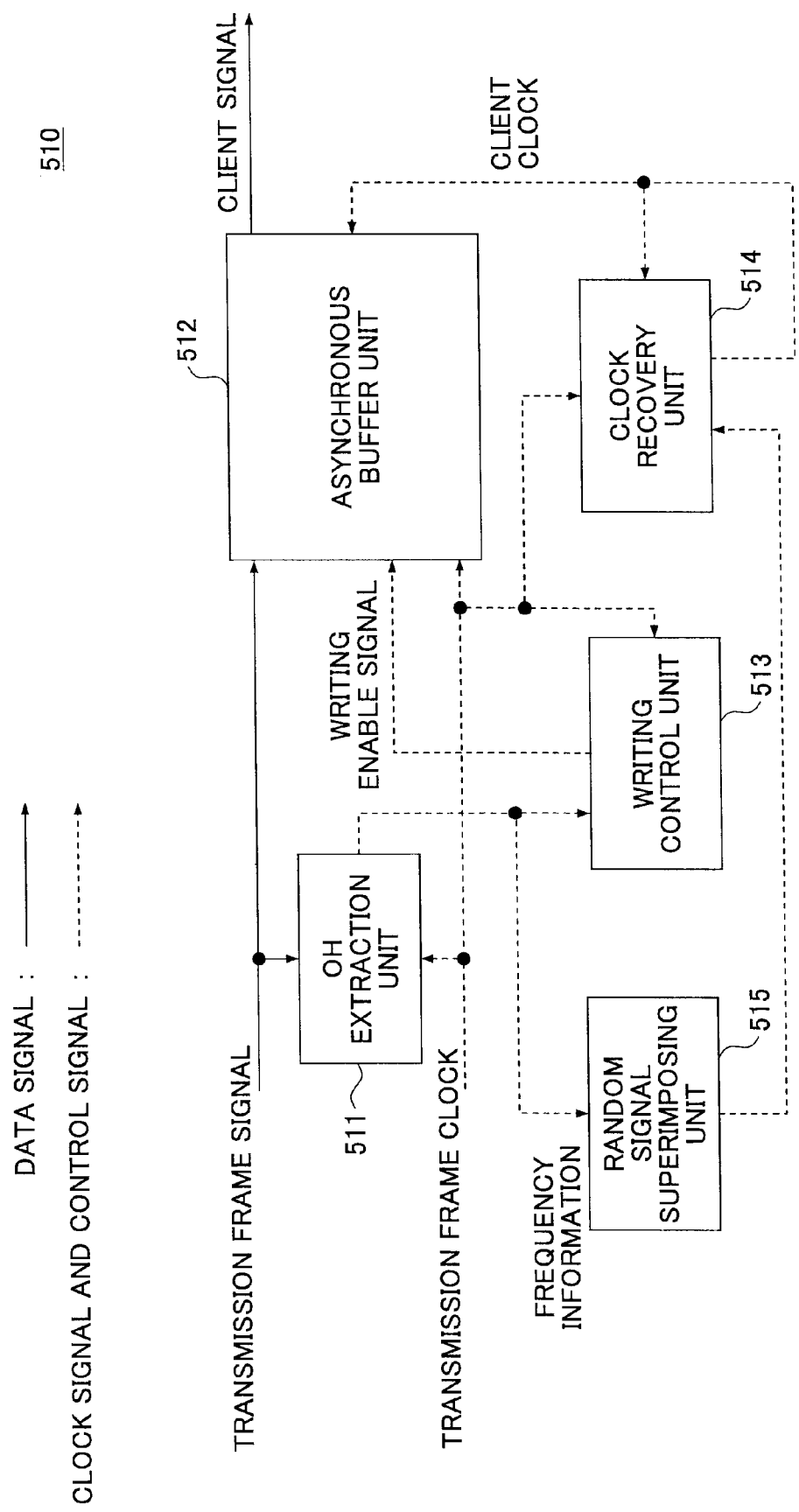
FIG. 14 is a block diagram of a client signal demapping circuit in the fifth embodiment of the present invention.

FIG. 13 shows a configuration of a client signal mapping circuit unit in the fifth embodiment of the present invention, and FIG. 14 shows a configuration of a client signal demapping circuit unit in the fifth embodiment of the present invention.

The present embodiment is different from the fourth embodiment in that the client signal demapping circuit unit 510 of the receiving side is provided with a random signal superimposing unit 515.

The client signal mapping circuit unit 410 shown in the figure includes an asynchronous buffer unit configured to temporarily store the client signal and convert a rate from the clock of the client signal to the clock of the transmission frame signal, a frequency information generation unit 411 configured to generate frequency information from the client clock and the transmission frame clock, a reading control unit 414 configured to output a reading enable signal corresponding to a period in which the client signal is mapped to the transmission frame based on the generated frequency information and the clock of the transmission frame, and an OH insertion unit 412 configured to insert an overhead of the transmission frame and the frequency information into data read from the asynchronous buffer unit 411.

On the other hand, the client signal demapping circuit unit 510 includes an OH extraction unit 511 configured to monitor an OH from the received transmission frame signal, a random signal superimposing unit 515 configured to superimpose a random sequence on frequency information in the OH, a writing control unit 513 configured to output a writing enable signal only in a period corresponding to the client signal based on the frequency information and the transmission frame clock, a clock recovery unit 514 configured to recover the client clock from the received transmission frame clock and the frequency information, and an asynchronous buffer unit 512 configured to convert clock from the transmission frame clock to the recovered client clock.

In the present embodiment, the client signal demapping circuit unit 510 superimposes a random sequence on frequency information. For superimposing the random sequence, like the fourth embodiment, a random sequence in which the average value is 0 is superimposed. An amplitude of the random sequence to be superimposed or the random sequence to be used may be selected arbitrarily.

The random signal superimposing unit 515 may be provided in both of the client signal mapping circuit 410 and the client signal demapping circuit 510. By providing the random signal superimposing unit 515 in the client signal demapping circuit unit 510, it is possible to perform superimposing processing for superimposing the random signal even when connecting to an apparatus in which the random signal superimposing unit is not provided in the client signal mapping circuit unit 410, so that it becomes possible to suppress occurrence of destuff jitter even when connecting to an existing apparatus.

Figure 15:
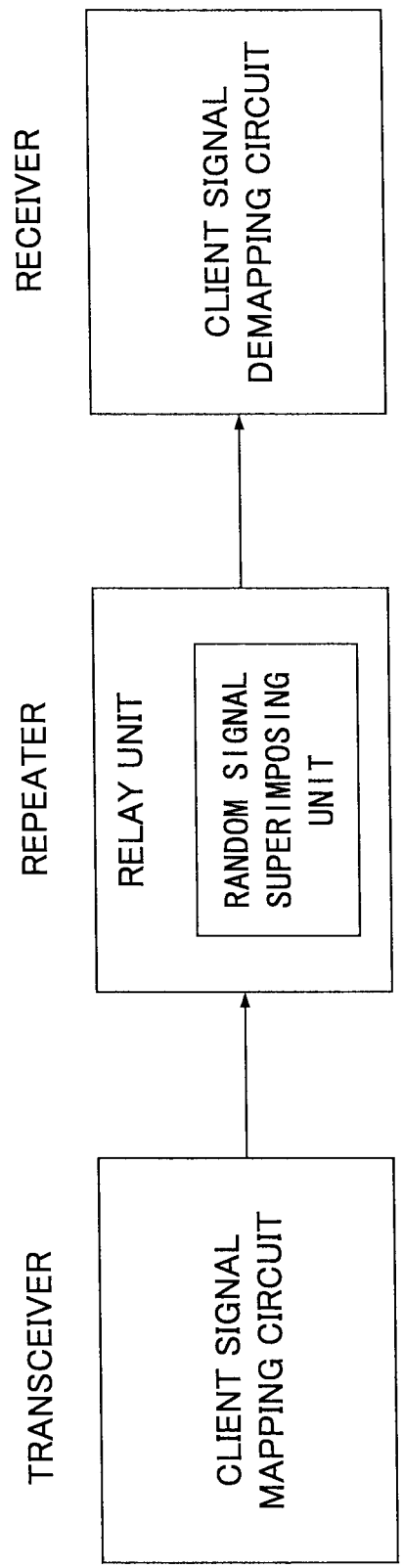
FIG. 15 shows a configuration in which a random signal superimposing unit is provided in a repeater in the fifth embodiment of the present invention.

As mentioned above, in the fourth embodiment and the fifth embodiment, although a configuration is described in which the random signal superimposing unit 403, 515 is provided in the transmitting side or the receiving side, a configuration in which a repeater includes the random signal superimposing unit can be adopted as shown in FIG. 15. The repeater once terminate the OH, and reads the frequency information. After that, the repeater superimposes the random sequence and inserts it OH again. As to OH termination, it is possible to superimpose the random sequence by terminating the whole OH or by terminating OH only in the part of the frequency information. The termination method depends on the configuration of the repeater, and the processing of superimposing the random sequence of the present invention can be carried out in any forms.

[Sixth Embodiment]

Figure 16:
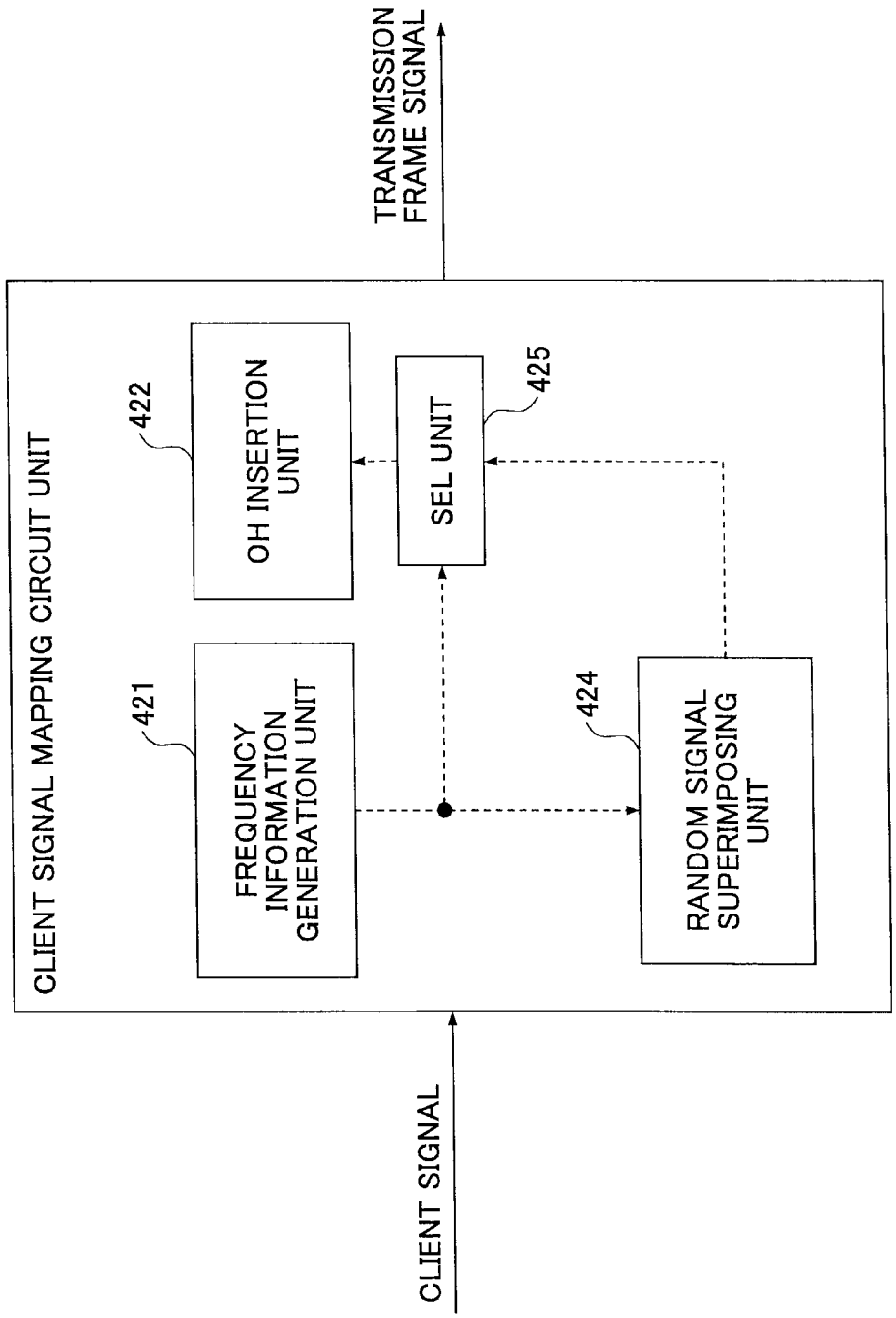
FIG. 16 is a block diagram (1) of a client signal mapping circuit in a sixth embodiment of the present invention.
Figure 17:
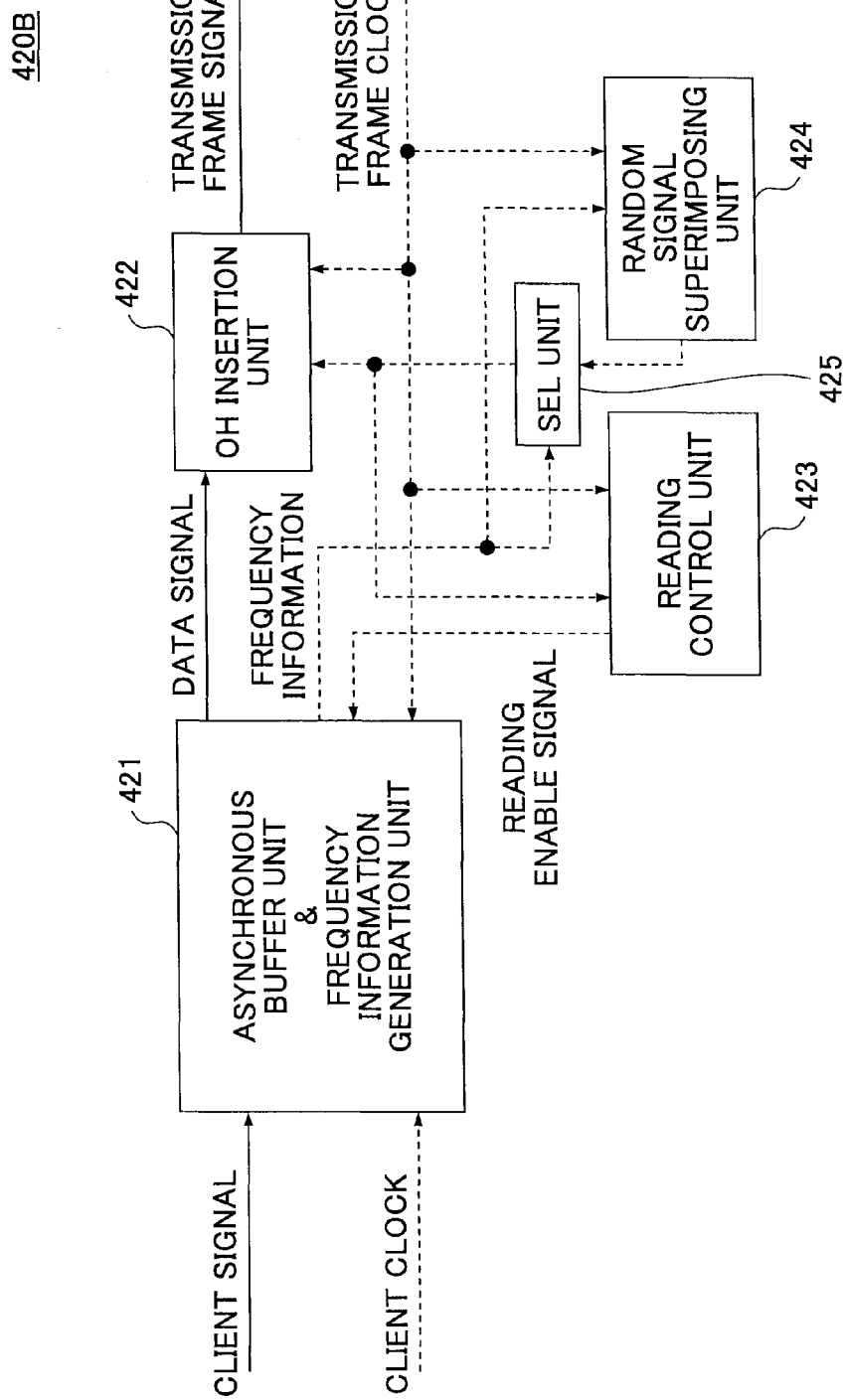
FIG. 17 is a block diagram (2) of a client signal mapping circuit in the sixth embodiment of the present invention.

FIGS. 16 and 17 are diagrams showing a configuration of the client signal mapping circuit unit in the sixth embodiment of the present invention.

The present embodiment is different from the fourth and the fifth embodiments in that a selector (to be refereed to as SEL hereinafter) unit 425 is newly provided. In the following, the client signal mapping circuit is described.

The client signal mapping circuit 420 includes an asynchronous buffer unit (provided in 421) configured to temporarily store the client signal and to convert the frequency of the client signal to the frequency of the OTN frame signal, a frequency information generation unit 421 configured to generate frequency information from the number of clocks of the client signal counted in the asynchronous buffer unit or from the client signal storing amount in the buffer unit, a random signal superimposing unit 424 configured to superimpose a random sequence on the generated frequency information, a SEL unit 425 configured to select between frequency information on which the random sequence is not superimposed and frequency information on which the random sequence is superimposed, and an OH insertion unit 422 configured to insert an OH to the client signal read from the asynchronous buffer unit 421 and to store the frequency information output from the SEL unit 425 into the OH.

Figure 19:
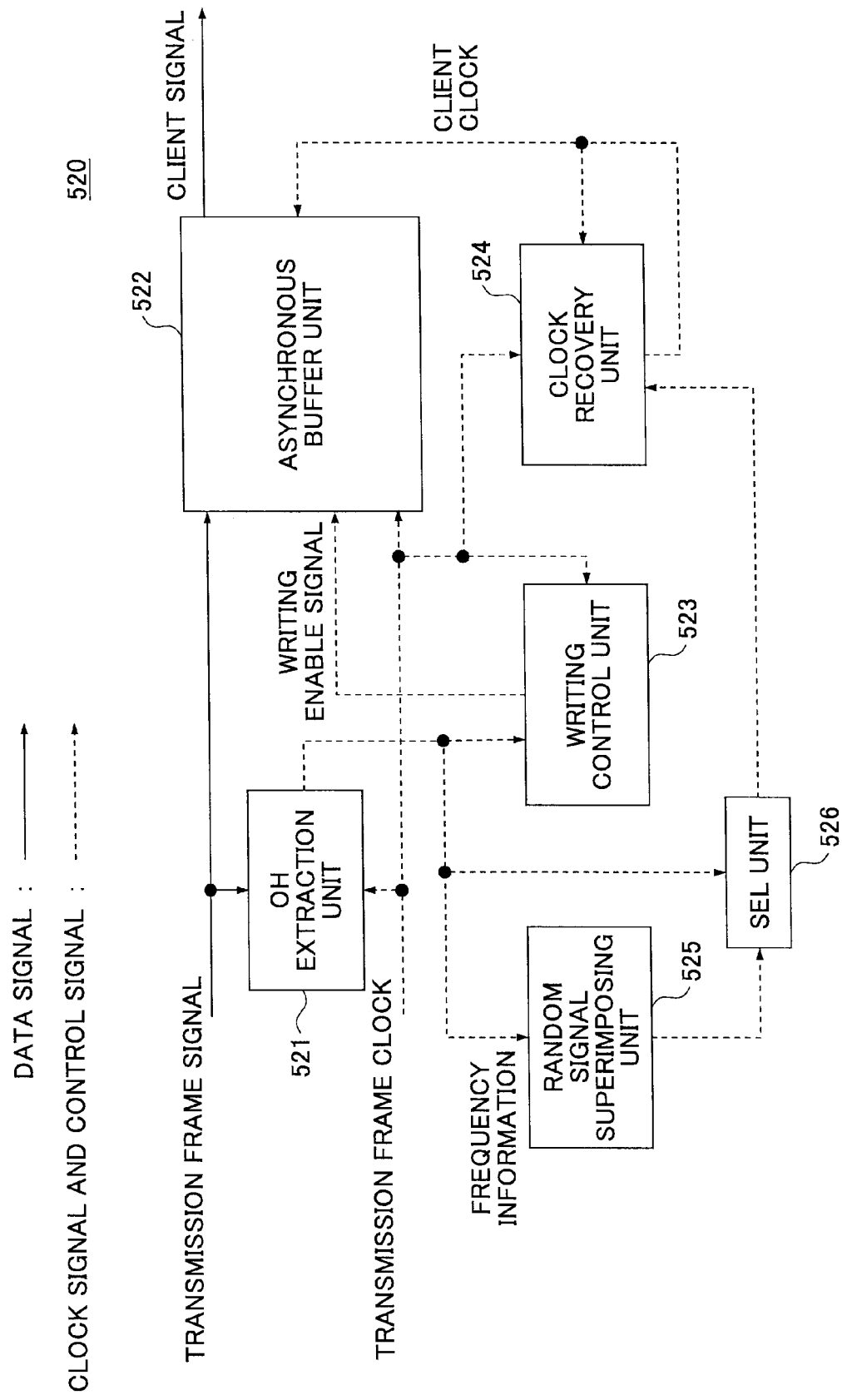
FIG. 19 is a block diagram of a client signal demapping circuit in the sixth embodiment of the present invention.

As to the SEL unit 425, manual switching by the user is possible, or automatic switching is possible based on the frequency information generated by the frequency information generation unit 421. In most cases, destuff jitter occurs when the frequency deviation between the client signal and the transmission frame signal is near 0 ppm. Thus, the SEL unit 425 selects frequency information on which the random sequence is superimposed for a frequency deviation where large destuff jitter occurs, and the SEL unit 425 selects frequency information generated by the frequency information generation unit 421 in a region of frequency deviation where destuff jitter does not occur very much (refer to FIG. 18, jitter output when STM-64 is accommodated in ODU2). When performing automatic switching by using frequency information, it is possible to set a switching threshold (a value of frequency information at which switching is carried out) by measuring or calculating a jitter occurrence amount corresponding to frequency deviation beforehand. The SEL unit 425 reads the frequency information and selects between frequency information on which the random sequence is not superimposed and frequency information on which the random sequence is superimposed. Also, like the fifth embodiment, the SEL 425 may be provided in the client signal demapping circuit unit 520 as shown in FIG. 19, and also the SEL 425 may be provided in both of the client signal mapping circuit unit and the client signal demapping circuit unit.

[Seventh Embodiment]

Figure 20:
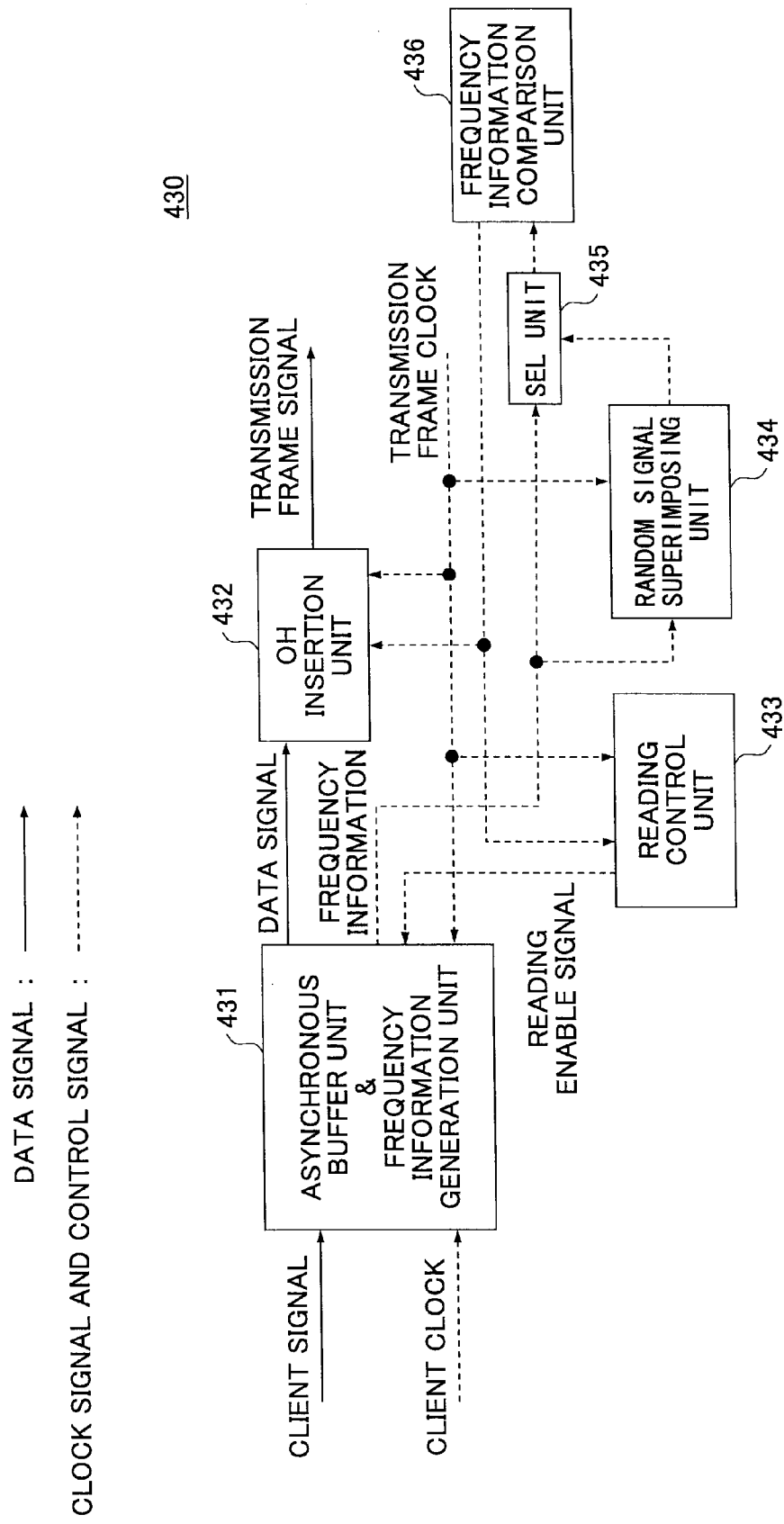
FIG. 20 is a block diagram of a client signal mapping circuit in the seventh embodiment of the present invention.

FIG. 20 shows a client signal mapping circuit unit in the seventh embodiment of the present invention. The present embodiment is different from the fourth and the fifth embodiments in that a frequency information comparison unit 436 is newly provided.

The client signal mapping circuit of the present embodiment is described.

The client signal mapping circuit 430 includes an asynchronous buffer unit configured to temporarily store the client signal and to convert the frequency of the client signal to the frequency of the OTN frame signal, a frequency information generation unit 431 configured to generate frequency information based on the number of clocks of the client signal counted in the asynchronous buffer unit or the client signal storing amount in the buffer unit, a random signal superimposing unit 434 configured to superimpose a random sequence on the generated frequency information, a SEL unit 435 configured to select between frequency information on which the random sequence is not superimposed and frequency information on which the random sequence id superimposed (a configuration in which the SEL unit is not provided may be adopted, in this case, an output from the random sequence superimposing unit 434 is output to the frequency information comparison unit directly), a frequency information comparison unit 436 configured to compare the frequency information output from the SEL unit 435 with a reference value held in the frequency information comparison unit 436, and to update the frequency information according to the comparison result, a reading control unit 433 configured to determine a read amount of the client signal based on the frequency information output from the frequency information comparison unit 436 and to output a reading enable signal, and an OH insertion unit 432 configured to insert an OH to the client signal read from the asynchronous buffer unit 432 and to store frequency information in the OH.

In the following, more detailed processing of the frequency information comparison unit 436 is described.

FIG. 21 shows frequency information (image) generated by the frequency information comparison unit 436 in the seventh embodiment of the present invention, and shows frequency information output from the frequency information generation unit 431, a random sequence, and frequency information on which the random sequence is superimposed. The graph in the upper-left in the figure is frequency information output from the frequency information generation unit 431. The frequency information is the number of client clocks detected in a case where the client signal is the CBR10G signal and the transmission frame signal is the OTU2. Te upper-right of FIG. 21 is the random sequence generated in the random sequence superimposing unit 434, and shows a random sequence of ±8. Also, the graph in the lower left of FIG. 21 is a result when superimposing the random sequence on the frequency information. The frequency information comparison unit 436 compares the frequency information on which the random sequence is superimposed with a reference value. In FIG. 21, the reference values are 3 values of 121344, 121352 and 121336. When frequency information supplied to the frequency information comparison unit 436 is equal to or greater than the upper limit value of 121352, the frequency information comparison unit 436 outputs 121352 as frequency information, when supplied frequency information is equal to or less than the lower limit value of 121336, the frequency information comparison unit 436 outputs 121336 as frequency information. Further, when the frequency information does not exceed the upper limit value or the lower limit value, the frequency information comparison unit 436 outputs 121344 as frequency information.

Accordingly, by providing the frequency information comparison unit 436, it is possible to convert the values of the generated frequency information from 4 values to 3 values. Thus, it becomes possible to apply embodiments of the present invention to AMP processing where stuff processing of 3 values of −1, 0 and 1 byte is performed.

In the following, a more detailed embodiment is described in a case where the present invention is applied to AMP processing.

Figure 22:
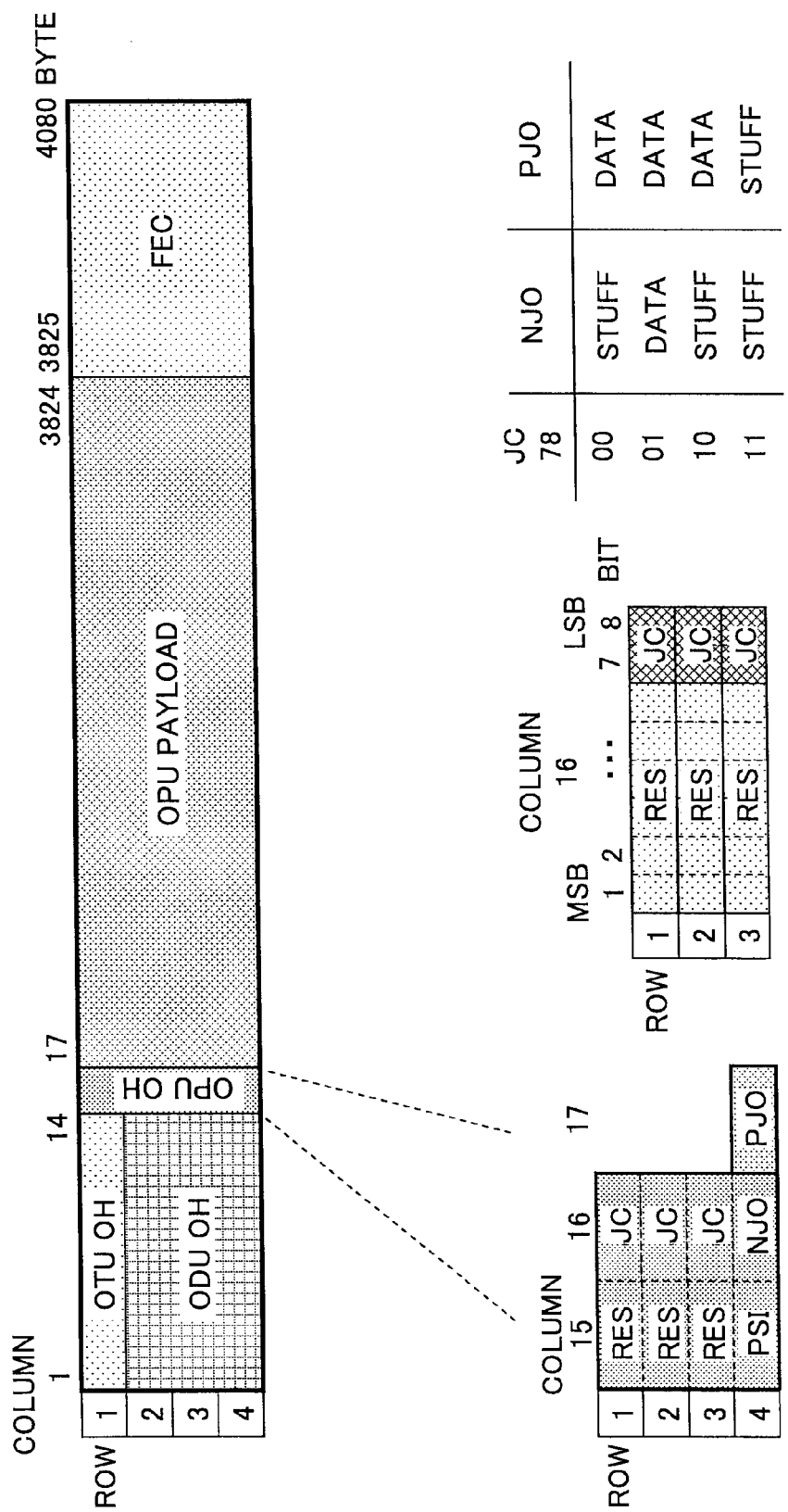
FIG. 22 shows a frame structure in a case where AMP processing is used in the seventh embodiment of the present invention.

FIG. 22 shows an OTN format that uses AMP. The OTN frame includes OTU (Optical channel Transport Unit) OH, ODU (Optical channel Data Unit) OH, OPU (Optical channel Payload Unit) OH, OPU Payload, and FEC (Forward Error Correction). OPU OH indicating mapping information of the client signal includes JC (Justification Control), PSI (Payload Structure Identifier), NJO (Negative Justification Opportunity), PJO (Positive Justification Opportunity), and RES (Reserved for future international standardization) (non-patent document 1). In AMP processing, frequency deviation can be absorbed by using NJO and PJO as a stuff byte or a data byte as necessary based on the frequency deviation of the client clock and the transmission frame clock. Also, the JC byte indicates correspondence between NJO or PJO and stuff byte or data byte.

That is, as shown in FIG. 22, when 7th and 8th bits of the JC byte are "00", NJO=stuff byte, and PJO=data byte, when 7th and 8th bits of the JC byte are "01", NJO=data byte, and PJO=data byte, when 7th and 8th bits of the JC byte are "10", NJO=stuff byte, and PJO=data byte, and when 7th and 8th bits of the JC byte are "11", NJO=stuff byte, and PJO=stuff byte. In the transmission side, the same JC byte is generated for Rows 1-3 of the Column 16, and in the receiving side, three JC bytes are determined by a majority decision, so as to determine stuff or data. In AMP, since stuff processing of three values of −1, 0, 1 byte is normally performed, three reference values are prepared for the frequency information comparison unit 436. As shown in FIG. 21, when the reference values are 121336, 12134 and 121352, and when frequency information output from the frequency comparison unit 436 is 121336, 7th and 8th bits of the JP byte are set to "11" so as to set NJO byte and the PJO byte to stuff bytes. When the frequency information is 121344, 7th and 8th bits of the JP byte are set to "00" so as to set NJO byte to stuff byte and set the PJO byte to data byte. When the frequency information is 121352, 7th and 8th bits of the JP byte are set to "01" so as to set NJO byte and the PJO byte to data bytes. The reading control unit 433 outputs a reading enable signal according to the stuff processing so as to accommodate the client signal into the transmission frame.

The embodiment of the present invention can be also applied to the case of asynchronous accommodation with GMP processing. In the following a more detailed embodiment is described in a case where the present invention is applied to the GMP processing.

Figure 23:
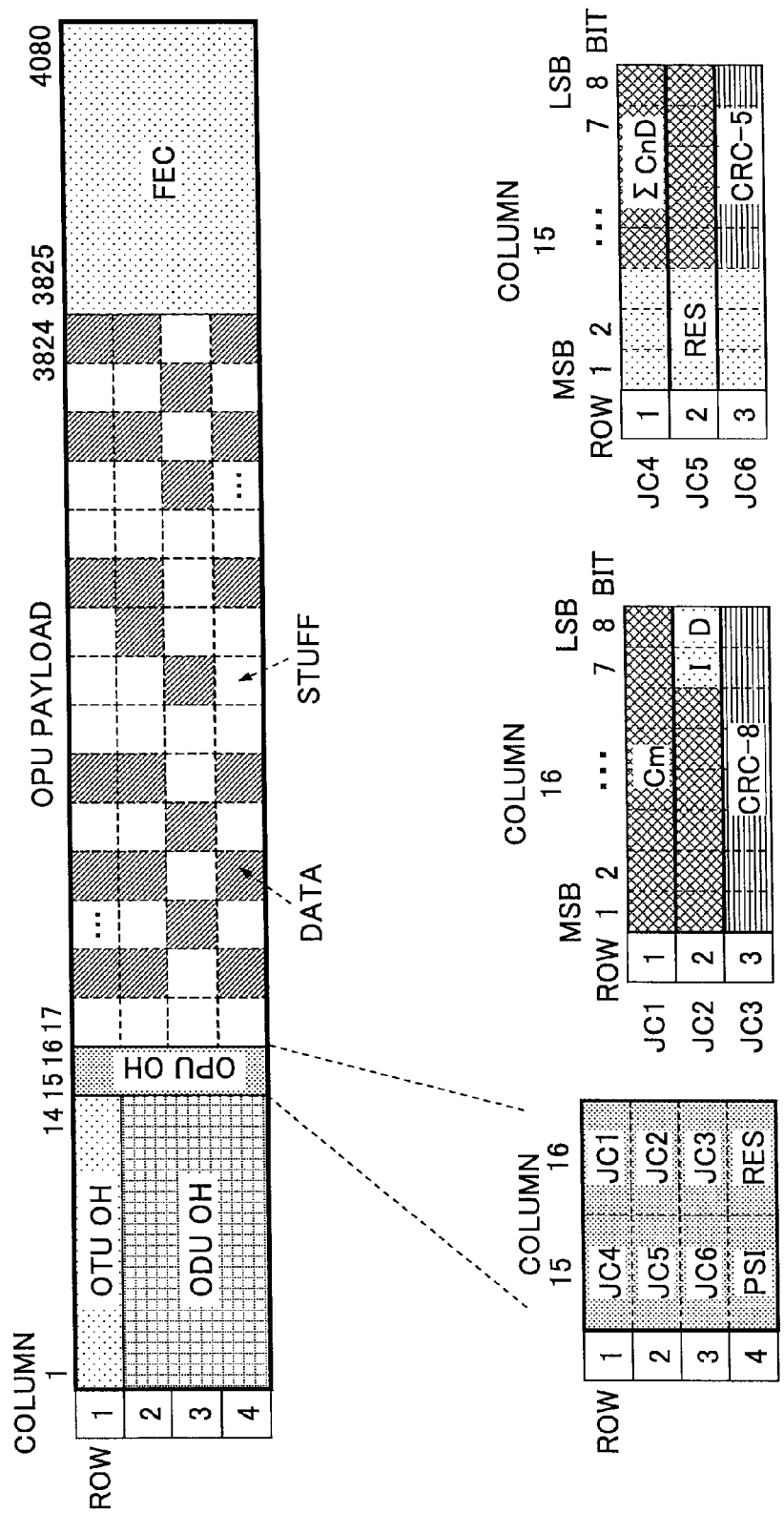
FIG. 23 shows an OH (overhead) structure in a case where GMP is used in the seventh embodiment of the present invention.

In the case of GMP, frequency information is detected based on the client clock and the transmission frame clock, and $C_m$ for determining a mapping position of the client signal and $\Sigma C_n D$ indicating frequency information of the client signal are transferred to the receiving side. FIG. 23 shows a transmission frame format in a case where GMP is used as the asynchronous accommodation scheme. In GMP, the payload area of the transmission frame is divided into a plurality of blocks in units of bits and each block is handled as a payload area or a stuff area. The m which is a unit of block is defined as m=M×8 in which M is the number of tributary slots of the transmission frame. The $C_m$ that determines the mapping position of the client signal can be obtained as follows based on a frequency $f_{client}$ of the client signal and a frequency $f_{server}$ of the transmission frame signal, $$C_m(t) = \operatorname{int}\left(\frac{f_{client}}{f_{server}} \times \frac{B_{server}/8}{M}\right)$$

wherein $B_{server}$ indicates the number of bits of the accommodating transmission frame. After determining $C_m$, a number i (1, 2, 3 . . . ) is assigned from the head of the blocks, and judgment of the stuff area or the data area is performed by using the following conditional expression.

if($i \times C_m$)mod $P < C_m \rightarrow$ DATA AREA if($i \times C_m$)mod $P \geq C_m \rightarrow$ STUFF AREA In the expression, p indicates the total number of the blocks. The $C_m$ is reported to the receiving side, and in the receiving side, judgment for the data area and the stuff area is performed using the conditional expression. Frequency information $C_n$ is used for clock restoration of the client signal. Since granularity of $C_m$ is large, it is used for determining the mapping position because implementation is easy. But, the larger the granularity is, the lower the clock recovery accuracy is. Thus, $C_n$ value of fine granularity is used. The $C_n$ is defined by the following formula.

$$C_n(t) = \operatorname{int}\left(\frac{f_{client} \times B_{server}}{f_{server} \times n}\right)$$

In the formula, n indicates granularity of $C_n$. When n=8, frequency information is transmitted in units of bytes, and when n=1, frequency information is transmitted in units of bits. Actually, in GMP, a difference $\Sigma C_n D$ of $C_m$ and $C_n$ in the same granularity is transferred instead of transferring $C_n$ as it is. By transferring frequency information as the difference, it is possible to decrease the number of bits necessary for transfer. The $\Sigma C_n D$ is represented by the following formula.

$$\Sigma C_{nD}(t) = C_n(t) - \left(\frac{8 \times M}{n} \times C_m(t)\right) + \Sigma C_{nD}(t-1)$$

A range that $\Sigma C_{nD}(t)$ can take is 0~7 for OPU0, 0~15 for OPU1, 0~63 for OPU2, 0~255 for OPU3, and 0~639 for OPU4 in a case where the client signal of CBR (Constant Bit Rate) is accommodated in LO ODU (Lower Order ODU). Therefore, the frequency information may take a plurality of pieces of frequency information within a defined range. Thus, handling of frequency information is different from that of AMP which may take three values. Therefore, when the client signal is FC-100 (Fibre Chanel 1G: bit rate is 1.0625 Gbit/s, frequency deviation is ±100 ppm) and the transmission frame signal is ODU0, the frequency information $C_n$ may take a value within a range of 13061~13065 (when n=8). Thus, reference values held in the frequency information comparison unit are 13061, 13062, 13063, 13064 and 13065, and the frequency information comparison unit compares the frequency information output from the random signal superimposing unit 434 with the reference value, and selects frequency information from the reference value.

The reference values of the frequency information comparison unit 436 described above are not limited to these values, and the number of the reference values may be any value such as 1, 2, 3, 4 . . . . In addition, like the fifth embodiment, the random sequence superimposing unit 434 and the frequency information comparison unit 436 may be provided in the client signal demapping circuit unit, or may be provided in the repeater, or a plurality of sets of the random sequence superimposing unit 434 and the frequency information comparison unit 436 may be provided in the client signal mapping circuit unit, the client signal demapping circuit unit, and the repeater.

Since a part of frequency information is lost in the frequency information comparison unit 436 in the present embodiment, there may be a case where overflow or underflow occurs in the asynchronous buffer. Therefore, a measure is used in which the used amount of the asynchronous buffer is monitored on the circuit, and when the used amount exceeds a particular threshold, frequency information is changed forcefully.

[Eighth Embodiment]

Figure 24:
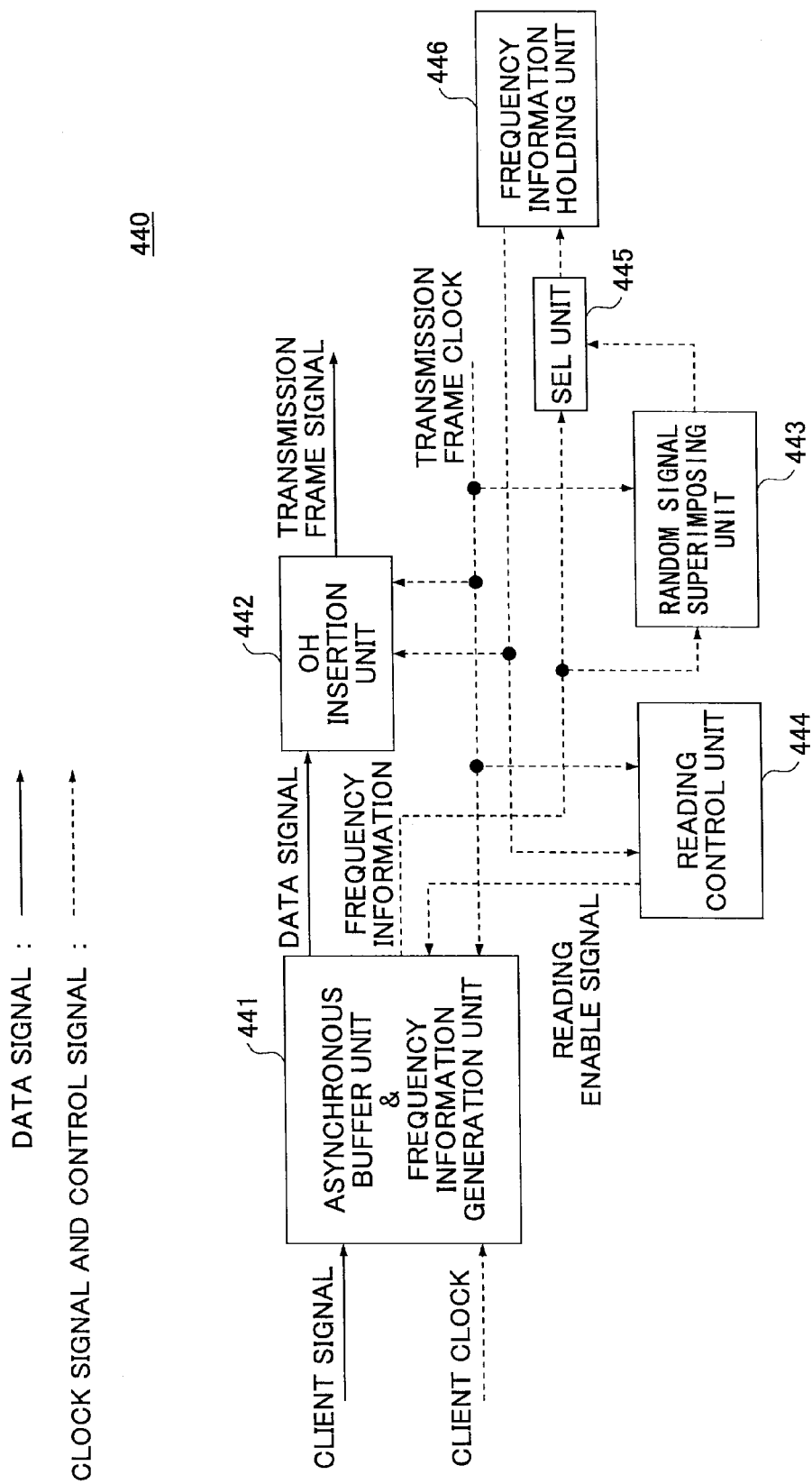
FIG. 24 is a block diagram of a client signal demapping circuit in an eighth embodiment of the present invention.

FIG. 24 shows a configuration of a client signal mapping circuit unit in the eighth embodiment of the present invention. The present embodiment is different from the seventh embodiment in that a frequency information holding unit 446 is newly provided.

Figure 25:
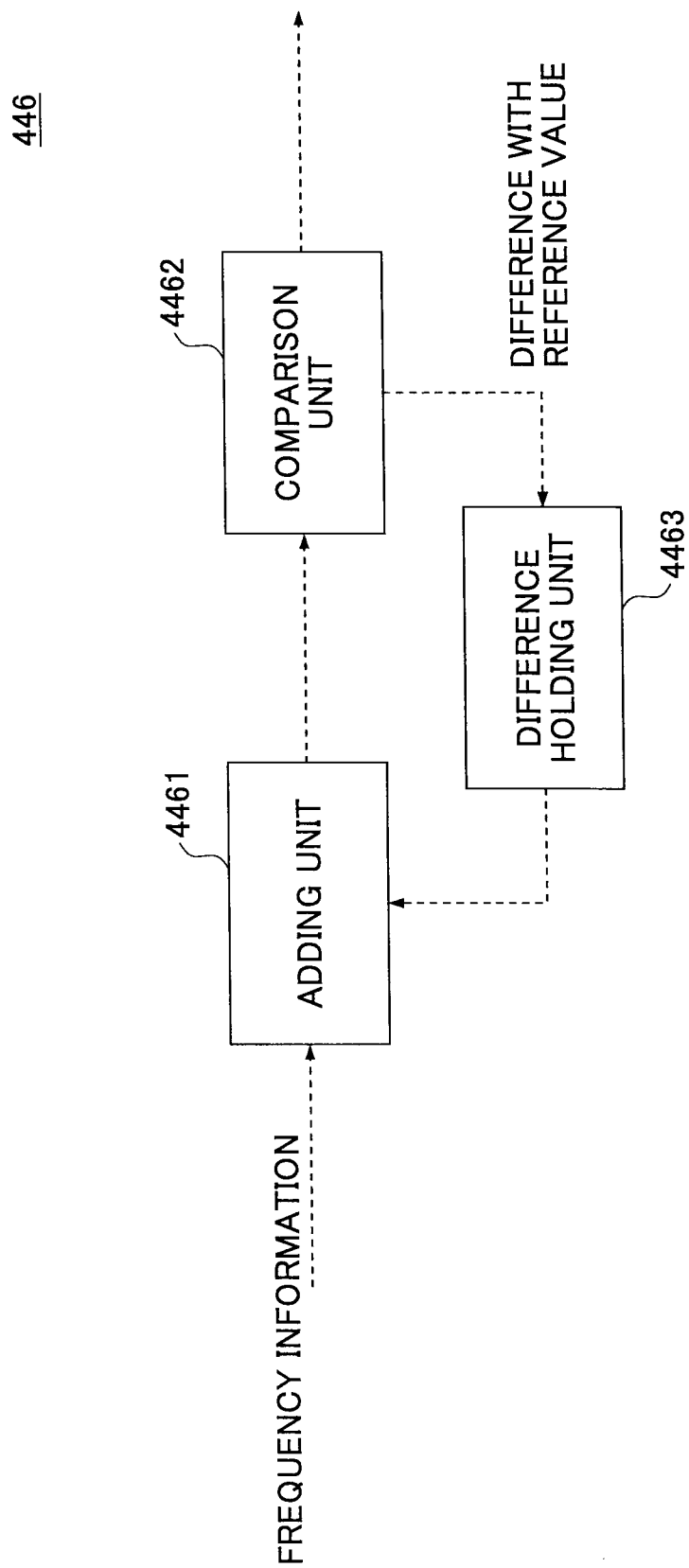
FIG. 25 is a block diagram of a frequency information holding unit in the eighth embodiment of the present invention.

Detailed operation of the frequency information holding unit 446 in the present embodiment is described with reference to FIG. 25. FIG. 25 shows a more detailed configuration of the frequency information holding unit 446. The frequency information holding unit 446 includes an adding unit configured to add supplied frequency information and a value held in the difference holding unit 4463, a comparison unit 4462 configured to compare the added frequency information with a reference value, and a difference holding unit 4463 configured to temporarily hold a difference between the frequency information and the reference value.

Figure 26:
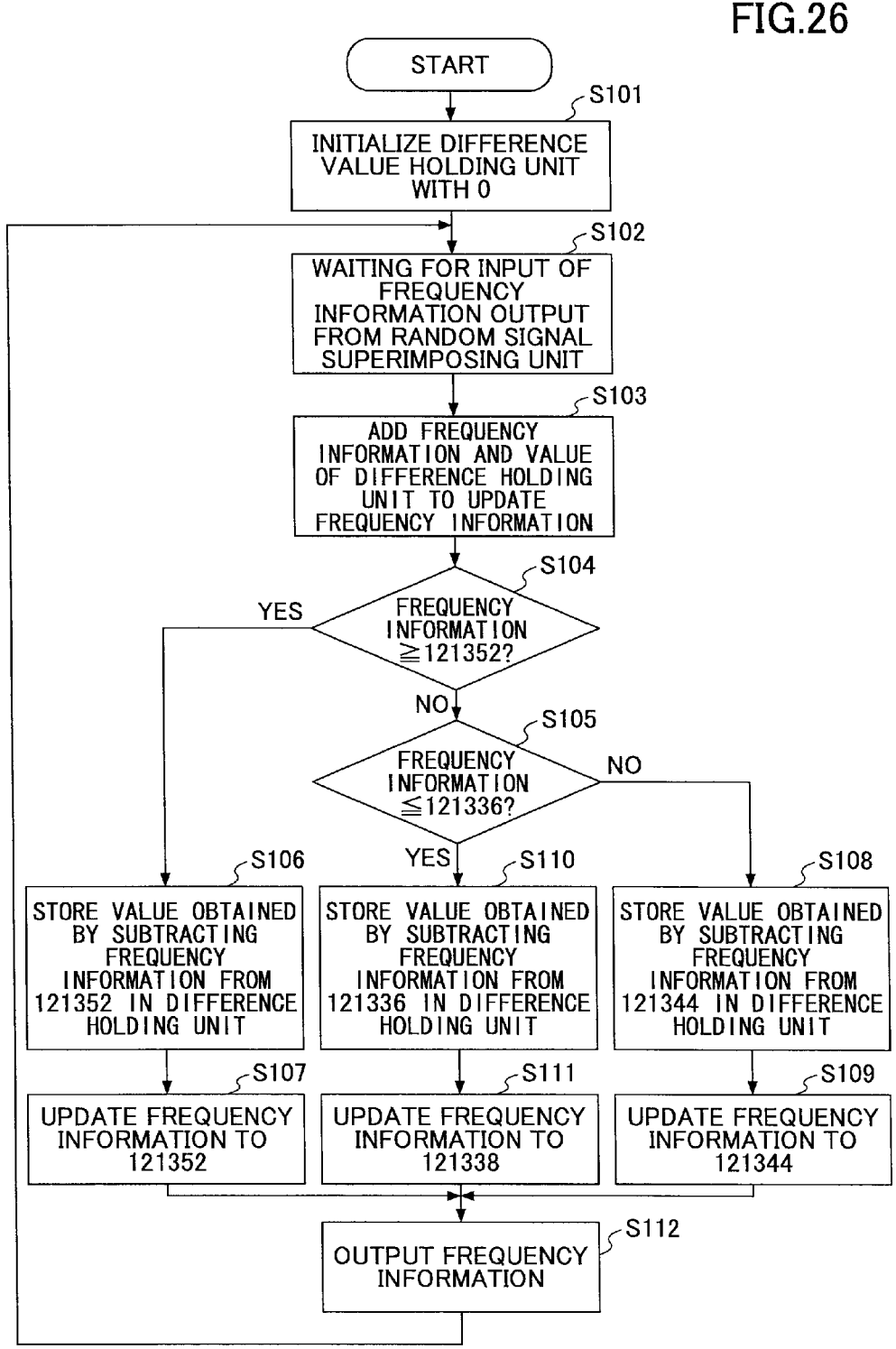
FIG. 26 is a control flow of a frequency information holding unit in the eighth embodiment of the present invention.

FIG. 26 shows a more concrete control flow in the frequency information holding unit 446.

An initial value of 0 is set to the difference holding unit 4463 in the frequency information holding unit 446 (step 101), and the frequency information holding unit 446 is in a waiting state until the frequency information is supplied from the random sequence superimposing unit (step 102). When the frequency information is supplied from the random signal superimposing unit 443, the adding unit 4461 adds the value held in the difference holding unit 4463 and the supplied frequency information (step 103), and the comparison unit 4462 compares the added frequency information with the reference value (steps 104, 105). A plurality of reference values can be arbitrarily used. In a case where the client signal is CBR10G and the transmission frame signal is OTU2, it is possible to use 121352 (the number of counts of client clocks when mutual frequency deviation is 0), 121336 and 121338 as the reference values. The control flow of FIG. 26 shows the example. But, the number of reference values and the values are not limited to these. Frequency information is selected and output based on comparison with the reference value and the comparison result in the comparison unit 4462 (steps 106-112). That is, for example, when the frequency information is equal to or greater than 121352 (yes in step 104), a value obtained by subtracting frequency information from 121352 is stored in the difference value holding unit 4463 (step 106), the frequency information is updated to 121352 (step 107) and it is output. For other cases, processing shown in FIG. 26 is performed.

The difference between the reference value and the supplied frequency information obtained by the comparison unit 4462 is held in the difference value holding unit 4463 until next frequency information is input to the frequency information holding unit 446. FIG. 27 shows an example of frequency information generated in the frequency information holding unit 446. The frequency information shown in the figure is frequency information, random sequence and frequency information on which the random sequence is superimposed, which are output from the frequency information holding unit 446. As mentioned above, by providing the frequency information holding unit 446, it becomes possible to put a restriction on the number of pieces of generated frequency information like the sixth embodiment, so that it becomes possible to apply the present invention to asynchronous accommodating schemes such as AMP and GMP. Also, by reflecting the value of the difference in the next frequency information, it becomes possible to suppress underflow and overflow in the asynchronous buffer unit 441.

Although embodiments of the present invention are described in detail, the present invention is not limited to the specifically disclosed embodiments, and variations and modifications may be made without departing from the scope of the claims.

DESCRIPTION OF REFERENCE SIGNS 100 buffer unit
110 buffer used amount monitoring unit
120 stuff processing determination unit
121 comparator
122 adding calculation unit
123 pseudo random sequence generation unit
130 stuff processing determination unit
131 comparator
132 adding calculation unit
133 pseudo random sequence generation unit
134 stuff information holding unit
140 stuff processing determination unit
141 comparator
142 first adding calculation unit
143 pseudo random sequence generation unit
145 stuff information holding unit
146 second adding calculation unit
147 averaging unit
148 third adding calculation unit
149 stuff information holding unit
200 reading control unit
300 overhead insertion unit
400 client signal mapping circuit unit
401 frequency information generation unit
402 OH (overhead) insertion unit
403 random signal superimposing unit
404 reading control unit
410 client signal mapping circuit unit
411 asynchronous buffer unit & frequency information generation unit
412 OH insertion unit
413 reading control unit
420 client signal mapping circuit unit
421 frequency information generation unit, asynchronous buffer unit & frequency information generation unit
422 OH insertion unit
424 random signal superimposing unit
425 selector (SEL) unit
430 client signal mapping circuit unit
431 asynchronous buffer unit & frequency information generation unit
432 OH insertion unit
433 reading control unit
434 random signal superimposing unit
435 SEL unit
436 frequency information comparison unit
440 client signal mapping circuit unit
441 asynchronous buffer unit & frequency information generation unit
442 OH insertion unit
443 random signal superimposing unit
444 reading control unit
445 SEL unit
446 frequency information holding unit
500 client signal demapping circuit unit
501 OH insertion unit
502 asynchronous buffer unit
503 writing control unit
504 clock recovery unit 510 client signal demapping circuit unit
511 OH insertion unit
512 asynchronous buffer unit
513 writing control unit
514 clock recovery unit
515 random signal superimposing unit
520 client signal demapping circuit unit
521 OH insertion unit
522 asynchronous buffer unit
523 writing control unit
524 clock recovery unit
525 random signal superimposing unit
526 SEL unit
4461 adding unit
4462 comparison unit
4463 difference holding unit

The invention claimed is:

1. A client signal mapping circuit for accommodating a client signal in a transmission frame signal, comprising:
an asynchronous buffer unit configured to temporarily store the client signal;
a frequency information generation unit configured to generate frequency information from a clock of the client signal and a clock of a transmission frame signal;
a random signal superimposing unit configured to superimpose a random signal sequence on the frequency information generated by the frequency information generation unit;
a reading control unit configured to control reading of the client signal from the asynchronous buffer unit based on the clock of the client signal and the frequency information;
an overhead insertion unit configured to insert an overhead of a transmission frame signal into a data sequence read from the asynchronous buffer unit; and
a selector unit configured to select one of frequency information on which the random signal sequence is superimposed and frequency information on which the random sequence is not superimposed.

2. A client signal mapping circuit for accommodating a client signal in a transmission frame signal, comprising:
an asynchronous buffer unit configured to temporarily store the client signal;
a frequency information generation unit configured to generate frequency information from a clock of the client signal and a clock of a transmission frame signal;
a random signal superimposing unit configured to superimpose a random signal sequence on the frequency information generated by the frequency information generation unit;
a reading control unit configured to control reading of the client signal from the asynchronous buffer unit based on the clock of the client signal and the frequency information;
an overhead insertion unit configured to insert an overhead of a transmission frame signal into a data sequence read from the asynchronous buffer unit; and
one of:
a frequency information comparison unit configured to compare frequency information on which the random signal sequence is superimposed with a reference value and to update the frequency information according to the comparison result; and
a frequency information holding unit configured to compare frequency information on which the random signal sequence is superimposed with a reference value, update the frequency information according to the comparison result, hold a difference between the frequency information and the comparison result temporarily, and perform adding calculation with next frequency information.

3. A client signal demapping circuit for restoring a client signal from a transmission frame signal, comprising:
an overhead extraction unit configured to extract frequency information from the transmission frame signal;
a writing control unit configured to perform writing control for the transmission frame based on the extracted frequency information and the clock of the transmission frame;
a random signal superimposing unit configured to superimpose a random signal sequence on the extracted frequency information;
a clock recovery unit configured to recover a clock of the client signal based on frequency information on which the random signal sequence is superimposed;
an asynchronous buffer unit configured to temporarily store the transmission frame based on a control signal from the writing control unit, and read data based on the clock recovered by the clock recovery unit; and
a selector unit configured to select one of frequency information on which the random signal sequence is superimposed and frequency information on which the random sequence is not superimposed.

4. A client signal demapping circuit for restoring a client signal from a transmission frame signal, comprising:
an overhead extraction unit configured to extract frequency information from the transmission frame signal;
a writing control unit configured to perform writing control for the transmission frame based on the extracted frequency information and the clock of the transmission frame;
a random signal superimposing unit configured to superimpose a random signal sequence on the extracted frequency information;
a clock recovery unit configured to recover a clock of the client signal based on frequency information on which the random signal sequence is superimposed;
an asynchronous buffer unit configured to temporarily store the transmission frame based on a control signal from the writing control unit, and read data based on the clock recovered by the clock recovery unit; and
one of:
a frequency information comparison unit configured to compare frequency information on which the random signal sequence is superimposed with a reference value and to update the frequency information according to the comparison result; and
a frequency information holding unit configured to compare frequency information on which the random signal sequence is superimposed with a reference value, update the frequency information according to the comparison result, hold a difference between the frequency information and the comparison result temporarily, and perform adding calculation with next frequency information.

5. A client signal mapping method for accommodating a client signal in a transmission frame signal, comprising:
a frequency information generation step in which a frequency information generation unit generates frequency information from a clock of the client signal obtained from an asynchronous buffer unit configured to temporarily store the client signal, and a clock of the transmission frame signal;

a random signal superimposing step in which a random signal superimposing unit superimposes a random signal sequence on the frequency information generated in the frequency information generation step;

a reading control step in which a reading control unit controls reading of the client signal from the asynchronous buffer unit based on the clock of the client signal and the frequency information, an overhead insertion step in which an overhead insertion unit inserts an overhead of a transmission frame signal into a data sequence read from the asynchronous buffer unit and one of:

step of selecting one of frequency information on which the random signal sequence is superimposed and frequency information on which the random sequence is not superimposed; and a frequency information comparison step of comparing frequency information on which the random signal sequence is superimposed with a reference value and updating the frequency information according to the comparison result.

6. A client signal mapping method for accommodating a client signal in a transmission frame signal, comprising:

a frequency information generation step in which a frequency information generation unit generates frequency information from a clock of the client signal obtained from an asynchronous buffer unit configured to temporarily store the client signal, and a clock of the transmission frame signal;

a random signal superimposing step in which a random signal superimposing unit superimposes a random signal sequence on the frequency information generated in the frequency information generation step;

a reading control step in which a reading control unit controls reading of the client signal from the asynchronous buffer unit based on the clock of the client signal and the frequency information;

an overhead insertion step in which an overhead insertion unit inserts an overhead of a transmission frame signal into a data sequence read from the asynchronous buffer unit; and a frequency information holding step of comparing frequency information on which the random signal sequence is superimposed with a reference value, updating the frequency information according to the comparison result, holding a difference between the frequency information and the comparison result temporarily, and performing adding calculation with next frequency information.

7. A client signal demapping method for restoring a client signal from a transmission frame signal, comprising:

an overhead extraction step in which an overhead extraction unit extracts frequency information from the transmission frame signal;

a writing control step in which a writing control unit performs writing control for the transmission frame based on the extracted frequency information and the clock of the transmission frame;

a random signal superimposing step in which a random signal superimposing unit superimposes a random signal sequence on the extracted frequency information;

a clock recovery step in which a clock recovery unit recover a clock of the client signal based on frequency information on which the random signal sequence is superimposed;

an asynchronous buffering step of temporarily storing the transmission frame based on a control signal in the writing control step, and reading data based on the clock recovered by the clock recovery step; and one of:

a step of selecting one of frequency information on which the random signal sequence is superimposed and frequency information on which the random sequence is not superimposed; and a frequency information comparison step of comparing frequency information on which the random signal sequence is superimposed with a reference value and updating the frequency information according to the comparison result.

8. A client signal demapping method for restoring a client signal from a transmission frame signal, comprising:

an overhead extraction step in which an overhead extraction unit extracts frequency information from the transmission frame signal;

a writing control step in which a writing control unit performs writing control for the transmission frame based on the extracted frequency information and the clock of the transmission frame;

a random signal superimposing step in which a random signal superimposing unit superimposes a random signal sequence on the extracted frequency information;

a clock recovery step in which a clock recovery unit recover a clock of the client signal based on frequency information on which the random signal sequence is superimposed;

an asynchronous buffering step of temporarily storing the transmission frame based on a control signal in the writing control step, and reading data based on the clock recovered by the clock recovery step; and a frequency information holding step of comparing frequency information on which the random signal sequence is superimposed with a reference value, updating the frequency information according to the comparison result, holding a difference between the frequency information and the comparison result temporarily, and performing adding calculation with next frequency information.

\* \* \* \* \*